(12) United States Patent
Kim et al.

(10) Patent No.: US 11,899,299 B2
(45) Date of Patent: Feb. 13, 2024

(54) DISPLAY APPARATUS

(71) Applicant: SAMSUNG ELECTRONICS CO., LTD., Suwon-si (KR)

(72) Inventors: Sungmin Kim, Suwon-si (KR); Juhyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/887,158

(22) Filed: Aug. 12, 2022

(65) Prior Publication Data

US 2023/0124477 A1  Apr. 20, 2023

Related U.S. Application Data

(63) Continuation of application No. PCT/KR2022/011092, filed on Jul. 28, 2022.

(30) Foreign Application Priority Data

Oct. 14, 2021  (KR) .......................... 10-2021-0136549

(51) Int. Cl.
*G02F 1/1333* (2006.01)
*G02F 1/1335* (2006.01)
*G02F 1/1368* (2006.01)

(52) U.S. Cl.
CPC .... *G02F 1/13332* (2021.01); *G02F 1/133512* (2013.01); *G02F 1/133531* (2021.01); *G02F 1/1368* (2013.01)

(58) Field of Classification Search
CPC ........... G02F 1/13332; G02F 1/133308; G02F 1/133334; G02F 1/133531; G02F 1/133512
See application file for complete search history.

(56) References Cited

U.S. PATENT DOCUMENTS

| 5,870,160 A | 2/1999 | Yanagawa et al. |
| 9,674,957 B2 | 6/2017 | Kang et al. |
| (Continued) | | |

FOREIGN PATENT DOCUMENTS

| EP | 3136160 A1 | 3/2017 |
| JP | 2014-122947 A | 7/2014 |
| (Continued) | | |

OTHER PUBLICATIONS

International Search Report dated Nov. 16, 2022, issued by the International Searching Authority in International Application No. PCT/KR2022/011092 (PCT/ISA/210).
(Continued)

*Primary Examiner* — Dung T Nguyen
(74) *Attorney, Agent, or Firm* — Sughrue Mion, PLLC

(57) ABSTRACT

A display apparatus includes a first film; a second film; a first substrate provided between the first film and the second film, the first substrate including a first protruding member protruding in a first direction from an edge of the first film and an edge of the second film; a second substrate provided between the first film and the second film, the second substrate including a second protruding member protruding in the first direction from an edge of the first substrate; a liquid crystal layer provided between the first substrate and the second substrate; a cover extending from the edge of the first film in the first direction; a photocuring material provided between the cover and the first protruding member of the first substrate, and attaching the cover to the first protruding member; and a blackening material blackened by light provided on at least a portion of a surface of the cover.

14 Claims, 18 Drawing Sheets

(56) References Cited

U.S. PATENT DOCUMENTS

| | | |
|---|---|---|
| 9,804,429 B2 | 10/2017 | Son et al. |
| 11,422,397 B2 | 8/2022 | Yang et al. |
| 2007/0076155 A1* | 4/2007 | Nakayama ........ G02F 1/133528 |
| | | 349/118 |
| 2011/0236643 A1 | 9/2011 | Tsubouchi et al. |
| 2013/0027857 A1 | 1/2013 | Jeong |
| 2014/0178618 A1 | 6/2014 | Tanabe et al. |
| 2015/0055316 A1 | 2/2015 | Ye et al. |
| 2018/0136516 A1* | 5/2018 | Yoo ................... G02F 1/133606 |

FOREIGN PATENT DOCUMENTS

| | | |
|---|---|---|
| KR | 10-1327743 B1 | 11/2013 |
| KR | 10-2015-0021368 A | 3/2015 |
| KR | 10-2015-0092692 A | 8/2015 |
| KR | 10-2017-0050707 A | 5/2017 |
| KR | 10-2132344 B1 | 7/2020 |
| KR | 10-2022-0002055 A | 1/2022 |

OTHER PUBLICATIONS

Written Opinion dated Nov. 16, 2022, issued by the International Searching Authority in International Application No. PCT/KR2022/011092 (PCT/ISA/237).

\* cited by examiner

DISPLAY APPARATUS

CROSS-REFERENCE TO RELATED APPLICATIONS

This application is a continuation application of International Application No. PCT/KR2022/011092, filed on Jul. 28, 2022, which claims priority to Korean Patent Application No. 10-2021-0136549, filed on Oct. 14, 2021, in the Korean Intellectual Property Office, the disclosures of which are incorporated by reference herein in their entireties.

BACKGROUND

1. Field

The disclosure relates to a display apparatus and more particularly to a display apparatus including a liquid crystal panel and a light source device.

2. Description of Related Art

Generally, a display apparatus converts obtained or stored electrical information into visual information and displays the visual information to a user and the display apparatus is used in various fields such as home or workplace.

The display apparatus includes a monitor apparatus connected to a personal computer or a server computer, a portable computer device, a navigation terminal device, a general television apparatus, an Internet Protocol television (IPTV), a portable terminal device, such as a smart phone, a tablet PC, a personal digital assistant (PDA) or a cellular phone, various display apparatuses used to reproduce images, such as advertisements or movies in an industrial field, or various kinds of audio/video systems.

A bezel is typically formed on a front edge of the display apparatus in order to fix accessory parts inside the display apparatus. The bezel may fix a film or a sheet forming a screen on the front surface of the display apparatus to a main body of the display apparatus.

However, a region in which an image is not displayed on the front surface of the display apparatus may increase due to the bezel, and a user's sense of immersion in the image may be reduced.

SUMMARY

Provided is a display apparatus capable of minimizing a width of a bezel.

Additional aspects of the disclosure will be set forth in part in the description which follows and, in part, will be obvious from the description, or may be learned by practice of the disclosure.

In accordance with another aspect of the disclosure, a display apparatus includes: a first film; a second film; a first substrate provided between the first film and the second film, the first substrate including a first protruding member protruding in a first direction from an edge of the first film and an edge of the second film; a second substrate provided between the first film and the second film, the second substrate including a second protruding member protruding in the first direction from an edge of the first substrate; a liquid crystal layer provided between the first substrate and the second substrate; a cover extending from the edge of the first film in the first direction; a photocuring material provided between the cover and the first protruding member of the first substrate, and attaching the cover to the first protruding member; and a blackening material blackened by light provided on at least a portion of a surface of the cover.

The blackening material may be provided on an entirety of an outer surface of the cover.

The blackening material may be blackened and the photocuring material may be cured by light emitted to the blackening material and the photocuring material, The blackening material may be provided on an outer surface of the cover in a first region of the cover, the first region being adjacent to the first film, and the display apparatus may further include a black paint configured to block light and provided on the outer surface of the cover in a second region of the cover, in which the blackening material is not provided.

The first region may overlap the first protruding member on which the photocuring material is provided.

The blackening material may be blackened and the photocuring material may be cured by light emitted to the first region in a second direction perpendicular to the first direction.

The outer surface of the cover in the first region may have a stripe or a dot pattern that is engraved or embossed thereon.

The blackening material may be blackened and the photocuring material may be cured by light emitted to an inside of the cover in the first direction.

The display apparatus may further include: a black paint configured to block light and provided on an outer surface of the cover in a first region of the cover, the first region being adjacent to the first film, and the blackening material may be provided on the outer surface of the cover in a second region of the cover, the second region being different than the first region.

The second region may not overlap or may only partially overlap a region in which the photocuring material is provided.

The blackening material may be blackened and the photocuring material may be cured by light emitted to the second region at an angle.

The cover may include a first cover member extending from the edge of the first film in the first direction; and a second cover member extending from one end of the first cover member in a second direction that is perpendicular to the first direction.

The second substrate may include a plurality of pixel electrodes and a plurality of thin film transistors respectively connected to the plurality of pixel electrodes, and the display apparatus may further include a cable attached to the second protruding member and configured to transmit image data to the plurality of thin film transistors.

The first film may include a first polarizing film, the second film may include a second polarizing film, and a polarizing direction of the first polarizing film may be perpendicular to a polarizing direction of the second polarizing film.

The first substrate may be provided between the liquid crystal layer and the first film; and the second substrate may be provided between the liquid crystal layer and the second film.

The blackening material may be provided on an inner surface of the cover in a first region of the cover, the first region being adjacent to the first film, and the display apparatus may further include a black paint configured to block light and provided on the inner surface of the cover in a second region of the cover, in which the blackening material is not provided.

The first region may overlap the first protruding member on which the photocuring material is provided.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
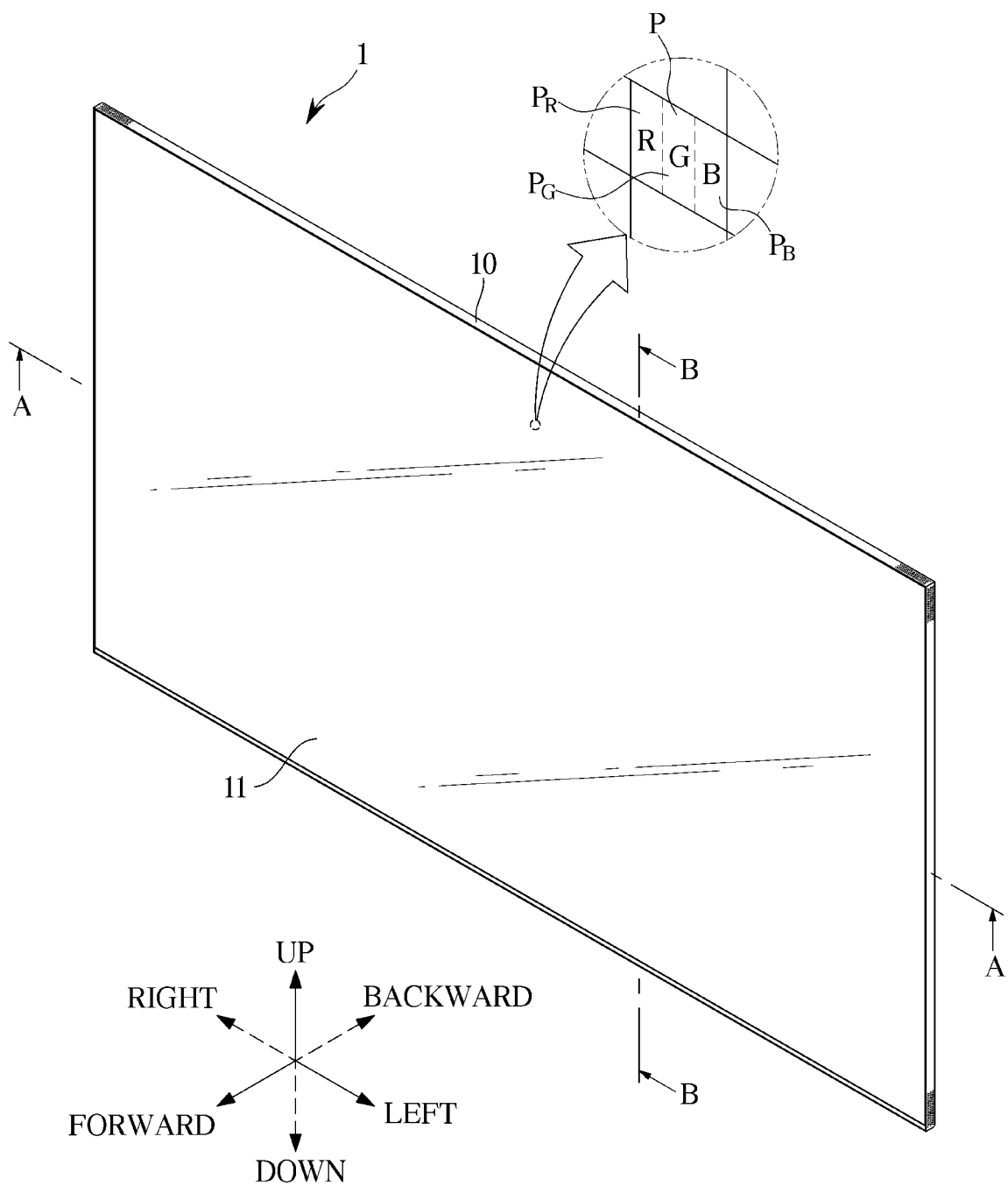
FIG. 1 is a view illustrating an example of an exterior of a display apparatus according to an embodiment of the disclosure.

In the following description, like reference numerals refer to like elements throughout the specification. Well-known functions or constructions are not described in detail since they would obscure the one or more exemplar embodiments with unnecessary detail. Terms such as "unit", "module", "member", and "block" may be embodied as hardware or software. According to embodiments, a plurality of "unit", "module", "member", and "block" may be implemented as a single component or a single "unit", "module", "member", and "block" may include a plurality of components.

It will be understood that when an element is referred to as being "connected" another element, it can be directly or indirectly connected to the other element, wherein the indirect connection includes "connection via a wireless communication network".

Also, when a part "includes" or "comprises" an element, unless there is a particular description contrary thereto, the part may further include other elements, not excluding the other elements.

Throughout the description, when a member is "on" another member, this includes not only when the member is in contact with the other member, but also when there is another member between the two members.

It will be understood that, although the terms first, second, third, etc., may be used herein to describe various elements, but is should not be limited by these terms. These terms are only used to distinguish one element from another element.

As used herein, the singular forms "a," "an" and "the" are intended to include the plural forms as well, unless the context clearly indicates otherwise.

An identification code is used for the convenience of the description but is not intended to illustrate the order of each step. The each step may be implemented in the order different from the illustrated order unless the context clearly indicates otherwise.

Reference will now be made in detail to embodiments of the disclosure, examples of which are illustrated in the accompanying drawings.

FIG. 1 is a view illustrating an example of an exterior of a display apparatus according to an embodiment of the disclosure.

A display apparatus 1 is a device that processes an image signal received from the outside and visually displays the processed image. Hereinafter a case in which the display apparatus 1 is a television is exemplified, but the disclosure is not limited thereto. For example, the display apparatus 1 may be implemented in various forms, such as a monitor, a portable multimedia device, and a portable communication device, and the display apparatus 1 is not limited in its shape as long as the display apparatus is configured to visually display an image.

The display apparatus 1 may be a large format display (LFD) installed outdoors, such as a roof of a building or a bus stop. The outdoor is not limited to the outside of a building, and thus the display apparatus 1 according to an embodiment may be installed in any places as long as the display apparatus is accessed by a large number of people, even indoors, such as subway stations, shopping malls, movie theaters, companies, and stores.

The display apparatus 1 may receive content data including a video signal and an audio signal from various content sources and output video and audio corresponding to the video signal and the audio signal. For example, the display apparatus 1 may receive content data through a broadcast reception antenna or cable, receive content data from a content playback device, or receive content data from a content providing server of a content provider.

As illustrated in FIG. 1, the display apparatus 1 may include a body 10, and a screen 11 configured to display an image I.

The body 10 may form an appearance of the display apparatus 1, and the body 10 may include a component configured to allow the display apparatus 1 to display the image I and to perform various functions. Although the body 10 illustrated in FIG. 1 is in the form of a flat plate, the shape of the body 10 is not limited thereto. For example, the body 10 may include a curved plate shape.

The screen 11 may be provided on a front surface of the body 10. "Front side" or "front surface" may represent a direction or a surface in which the screen 11 is formed with respect to the body 10. "Rear side", "upper side", "lower side", "left side", and "right side" may be defined with respect to a view from which the display apparatus 1 is viewed from "front side"

The screen 11 may display the image I. For example, the screen 11 may display a still image or a moving image. Further, the screen 11 may display a two-dimensional plane image or a three-dimensional image using binocular parallax of the user.

The screen 11 may include a self-emission panel (for example, a light emitting diode panel or an organic light emitting diode panel) configured to directly emit light or a non-self-emission panel (for example, a liquid crystal panel) configured to transmit or block light emitted by a light source device (for example, a backlight unit).

A plurality of pixels P may be formed on the screen 11 and the image I displayed on the screen 11 may be formed by a combination of the lights emitted from the plurality of pixels P. For example, an image I may be formed on the screen 11 by combining light emitted from the plurality of pixels P as a mosaic.

Each of the plurality of pixels P may emit different brightness and different color of light. In order to emit light in the various colors, the plurality of pixels P may include sub-pixels $P_R$, $P_G$, and $P_B$, respectively.

The sub-pixels $P_R$, $P_G$, and $P_B$ may include a red sub pixel $P_R$ emitting red light, a green sub pixel $P_G$ emitting green light, and a blue sub pixel $P_B$ emitting blue light. For example, the red light may represent a light beam having a wavelength of approximately 620 nm (nanometers, one billionth of a meter) to 750 nm, the green light may represent a light beam having a wavelength of approximately 495 nm to 570 nm, and the blue light may represent a light beam having a wavelength of approximately 450 nm to 495 nm.

By combining the red light of the red sub pixel $P_R$, the green light of the green sub pixel $P_G$ and the blue light of the blue sub pixel $P_B$, each of the plurality of pixels P may emit different brightness and different color of light.

Figure 2:
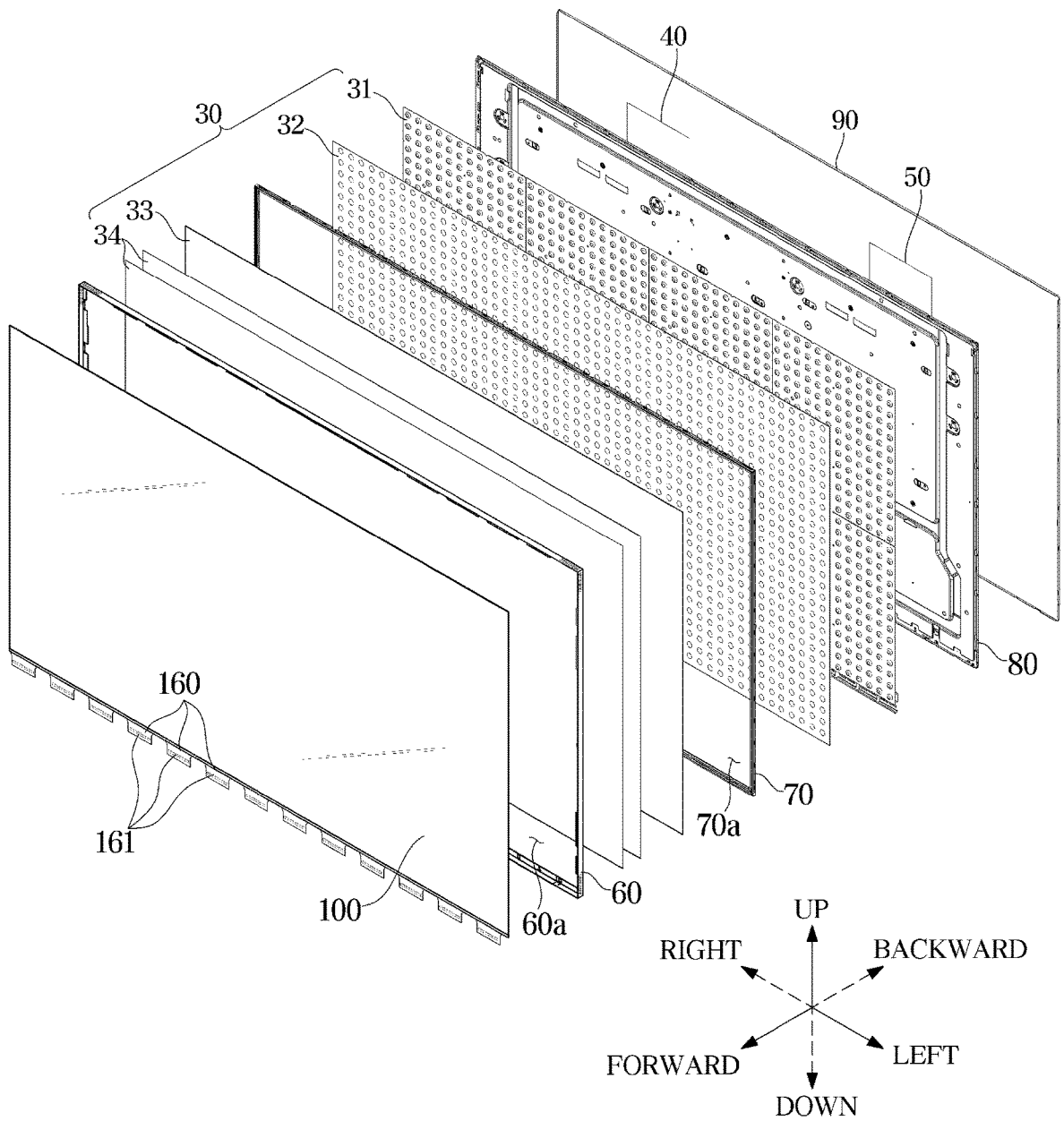
FIG. 2 is a view illustrating an example of a structure of the display apparatus according to an embodiment of the disclosure.
Figure 3:
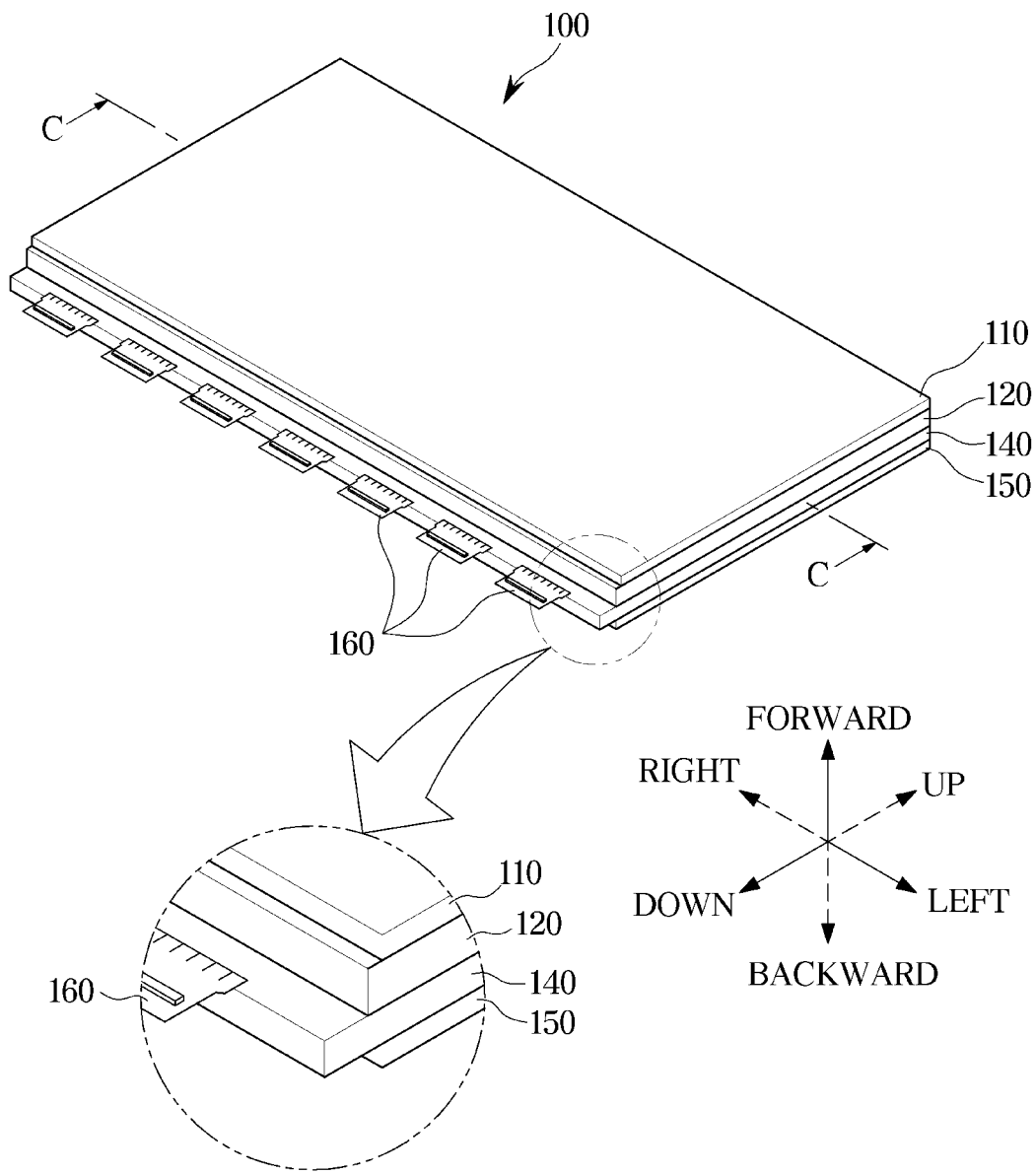
FIG. 3 is a view illustrating an example of a liquid crystal panel of the display apparatus according to an embodiment of the disclosure.
Figure 4:
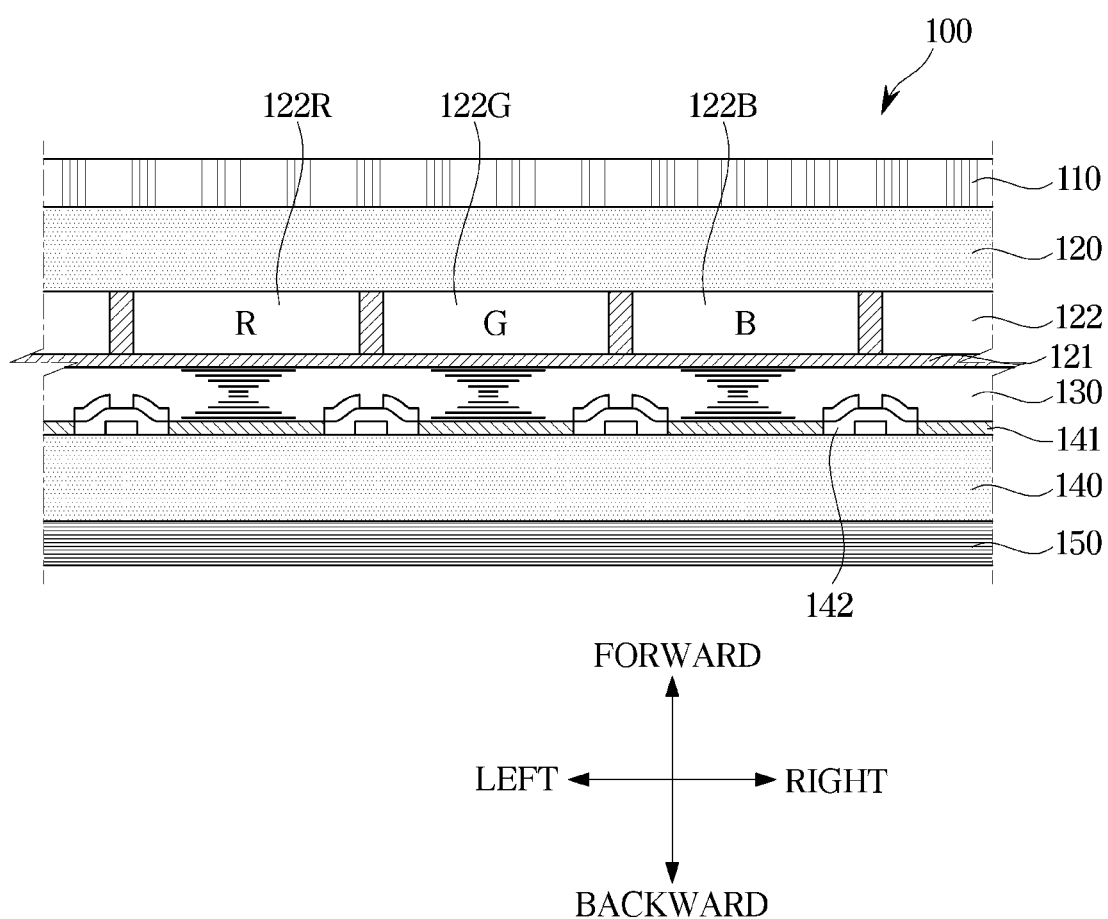
FIG. 4 is a cross-sectional view taken along line C-C of FIG. 3.

FIG. 2 is a view illustrating an example of a structure of the display apparatus according to an embodiment of the disclosure. FIG. 3 is a view illustrating an example of a liquid crystal panel of the display apparatus according to an embodiment of the disclosure. FIG. 4 is a cross-sectional view taken along line C-C of FIG. 3.

As illustrated in FIG. 2, various components configured to generate an image I on the screen 11 may be provided inside the body 10.

For example, the body 10 includes a light source device 30 that is a surface light source (the light source device is referred to as various names such as 'backlight unit'), a liquid crystal panel 100 configured to block or transmit light emitted from the light source device 30, a control assembly 40 configured to control an operation of the light source device 30 and the liquid crystal panel 100, and a power assembly 50 configured to supply power to the light source device 30 and the liquid crystal panel 100.

The light source device 30 may include a light source module 31 configured to emit light, a reflective sheet 32 configured to reflect light, a diffuser plate 130 configured to uniformly diffuse light, and an optical sheet 34 configured to improve luminance of emitted light.

The light source module 31 may include a plurality of light sources 31a configured to emit light, and a substrate 31b configured to support/fix the plurality of light sources 31a.

The plurality of light sources 31a may be arranged in a predetermined pattern to allow light to be emitted with uniform luminance. The plurality of light sources 31a may be arranged in such a way that a distance between one light source and light sources adjacent thereto is the same.

For example, the plurality of light sources 31a may be arranged in rows and columns. Accordingly, the plurality of light sources may be arranged such that an approximately square is formed by four adjacent light sources. In addition, any one light source may be arranged adjacent to four light sources, and a distance between one light source and four adjacent light sources may be approximately the same. However, the pattern in which the plurality of light sources 31a is arranged is not limited to the pattern described above, and the plurality of light sources 31a may be arranged in various patterns to allow light to be emitted with uniform luminance.

The light source 31a may include an element (for example, a light emitting diode) configured to emit monochromatic light (light of a specific wavelength range, or light of a single peak wavelength, for example, blue light) or white light (light of a plurality of peak wavelengths, for example, light of a mixture of red light, green light, and blue light) in various directions by receiving power.

The substrate 31b may fix the plurality of light sources 31a to prevent a change in the position of the light source 31a. Further, the substrate 31b may supply power, which is for the light source 31a to emit light, to the light source 31a.

The reflective sheet 32 may reflect light emitted from the plurality of light sources 31a forward or in a direction close to the front.

In the reflective sheet 32, a plurality of through holes 32a is formed at positions corresponding to each of the plurality of light sources 31a of the light source module 31. In addition, the light source 31a of the light source module 31 may pass through the through hole 32a and protrude to the front of the reflective sheet 32. Accordingly, the plurality of light sources 31a may emit light in front of the reflective sheet 32. The reflective sheet 32 may reflect light, which is emitted toward the reflective sheet 32 from the plurality of light sources 31a, toward the diffuser plate 33.

The diffuser plate 33 may be provided in front of the light source module 31 and the reflective sheet 32. The diffuser plate 33 may evenly distribute the light emitted from the light source 31a of the light source module 31. The diffuser plate 33 may diffuse light emitted from the plurality of light sources 31a within the diffuser plate 33 in order to remove unevenness in luminance caused by the plurality of light sources 31a. In other words, the diffuser plate 33 may uniformly emit uneven light of the plurality of light sources 31a to the front surface.

The optical sheet 34 may include various sheets for improving luminance and uniformity of luminance. For example, the optical sheet 34 may include an optical conversion sheet, a diffusion sheet, a prism sheet, and a reflective polarizing sheet.

As mentioned above, the light source device 30 may refract, reflect, and scatter light emitted from the point light source, thereby emitting uniform surface light forward.

The liquid crystal panel 100 may be provided in front of the light source device 30 and configured to block or transmit light emitted from the light source device 30 to form the image I.

A front surface of the liquid crystal panel 100 may form the screen 11 of the display apparatus 1 described above, and the liquid crystal panel 100 may form the plurality of pixels P. In the liquid crystal panel 100, the plurality of pixels P may independently block or transmit light from the light source device 30. The light transmitted through the plurality of pixels P may form the image I displayed on the screen 11.

For example, as illustrated in FIGS. 3 and 4, the liquid crystal panel 100 may include a first polarizing film 110, a first transparent substrate 120, a liquid crystal layer 130, a second transparent substrate 140, and a second polarizing film 150. The first polarizing film 110, the first transparent substrate 120, the liquid crystal layer 130, the second transparent substrate 140, and the second polarizing film 150 may be sequentially laminated from the front side to the rear side.

The first and second transparent substrates 120 and 140 may be formed of tempered glass or transparent resin.

A common electrode 121 and a color filter 122 may be provided on the first transparent substrate 120, and a pixel electrode 141 and a thin film transistor (TFT) 142 may be provided on the second transparent substrate 140.

The color filter 122 may include a red filter 122R transmitting red light, a green filter 122G transmitting green light, and a blue filter 122G transmitting blue light. The red filter 122R, the green filter 122G, and the blue filter 122B may be arranged parallel to each other. A region in which the color filter 122 is formed corresponds to the pixel P described above. A region in which the red filter 122R is formed corresponds to the red sub-pixel $P_R$, a region in which the green filter 122G is formed corresponds to the green sub-pixel $P_G$, and a region in which the blue filter 122B is formed corresponds to the blue sub-pixel $P_B$.

The pixel electrode 141 may be provided inside the second transparent substrate 140, and the common electrode 121 may be provided inside the first transparent substrate 120. The pixel electrode 141 and the common electrode 121 may be formed of a metal material through which electricity is conducted, and may generate an electric field to change an arrangement of liquid crystal molecules 151a forming the liquid crystal layer 130 to be described below.

The TFT 142 is provided inside the second transparent substrate 140. The TFT 142 may be turned on (closed) or turned off (opened) by image data provided from a panel driver 161. An electric field may be generated or removed between the pixel electrode 141 and the common electrode 121 in response to turning on (closing) or turning off (opening) the TFT 142.

The first polarizing film 110 and the second polarizing film 150 are arranged on the outside of the first transparent substrate 120 and the second transparent substrate 140, respectively.

The first polarizing film 110 and the second polarizing film 150 may transmit specific polarized light and block (reflect or absorb) other polarized light. For example, the first polarizing film 110 may transmit light polarized in a first direction and block (reflect or absorb) other polarized light. In addition, the second polarizing film 150 may transmit light polarized in a second direction and block (reflect or absorb) other polarized light. The first direction and the second direction may be perpendicular to each other. Accordingly, the polarized light passing through the first polarizing film 110 may not directly pass through the second polarizing film 150.

The liquid crystal layer 130 may be arranged between the first transparent substrate 120 and the second transparent substrate 140.

The liquid crystal layer 130 is formed between the pixel electrode 141 and the common electrode 121, and the liquid crystal layer 130 is filled with the liquid crystal molecules 131. Liquid crystals represent an intermediate state between a solid (crystal) and a liquid. Liquid crystals may exhibit optical properties according to changes in an electric field. For example, in the liquid crystal, the direction of the arrangement of molecules forming the liquid crystal may change according to a change in an electric field. As a result, the optical properties of the liquid crystal layer 130 may vary depending on the presence or absence of the electric field passing through the liquid crystal layer 130. For example, depending on the presence or absence of the electric field, the liquid crystal panel 130 may rotate a polarizing direction of the light with respect to an optical axis. Accordingly, the polarizing direction of the polarized light passing through the first polarizing film 110 may be rotated while passing through the liquid crystal layer 130, and then pass through the second polarizing film 150.

A cable 160 configured to transmit image data to the liquid crystal panel 100 may be arranged on a lower side of the liquid crystal panel 100.

As illustrated in FIG. 3, the second transparent substrate 140 may more protrude downward/outward from edges of the first polarizing film 110, the first transparent substrate 120, the liquid crystal layer 130, and the second polarizing film 150.

The cable 160 may be connected to a protruding member of the second transparent substrate 140. The pixel electrode 141 and the TFT 142 may be provided on the second transparent substrate 140, and the cable 160 may be electrically connected to the pixel electrode 141 and the TFT 142. Further, the cable 160 may be electrically connected to the control assembly 40 and the power assembly 50. Accordingly, the cable 160 may electrically connect the control assembly 40/the power assembly 50 to the second transparent substrate 140.

The cable 160 may include a flexible flat cable or a film cable that is bendable.

A display driver integrated circuit (DDI) (hereinafter referred to as 'panel driver') 161 configured to process digital image data and output an analog image signal may be provided on the cable 160.

The panel driver 161 may receive image data and power from the control assembly 40/the power assembly 50 through the cable 160. The panel driver 161 may supply the image data and driving current to the second transparent substrate 140 of the liquid crystal panel 100 through the cable 160.

The cable 160 and the panel driver 161 may be integrally implemented as a film cable, a chip on film (COF), or a tape carrier package (TCP). In other words, the panel driver 161 may be arranged on the cable 160. However, the disclosure is not limited thereto, and the panel driver 161 may be arranged on the liquid crystal panel 100.

The control assembly 40 may include a control circuit configured to control an operation of the liquid crystal panel 100 and the light source device 30. For example, the control circuit may process a video signal and/or audio signal received from an external content source. The control circuit may transmit the image data to the liquid crystal panel 100, and transmit dimming data to the light source device 30.

The power assembly 50 may include a power circuit configured to supply power to the liquid crystal panel 100 and the light source device 30. The power circuit may supply power to the control assembly 40, the light source device 30 and the liquid crystal panel 100.

The control assembly 40 and the power assembly 50 may be implemented as a printed circuit board and various circuits mounted on the printed circuit board. For example, the power circuit may include a capacitor, a coil, a resistance element, a processor, and a power circuit board on which the capacitor, the coil, the resistance element, and the processor are mounted. Further, the control circuit may include a memory, a processor, and a control circuit board on which the memory and the processor are mounted.

Further, the body 10 may include a front frame 60, a middle frame 70, a rear chassis 80, and a rear cover 90, which are to support the liquid crystal panel 100, the light source device 30, the control assembly 40, and the power assembly 50.

Figure 5:
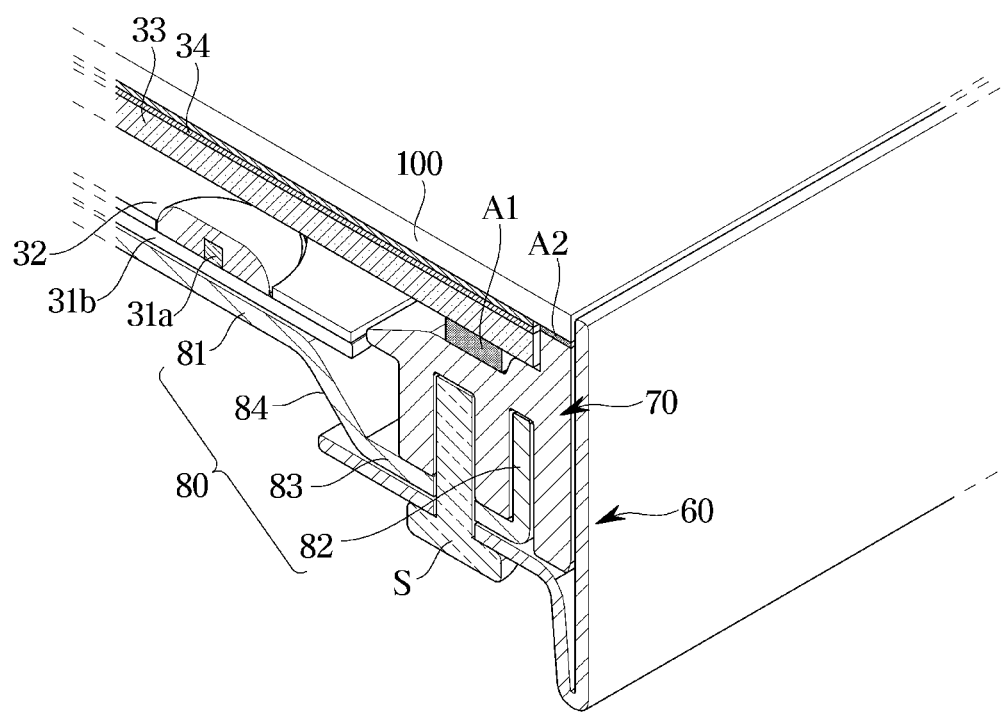
FIG. 5 is a cutaway view taken along line A-A of FIG. 1.
Figure 5:
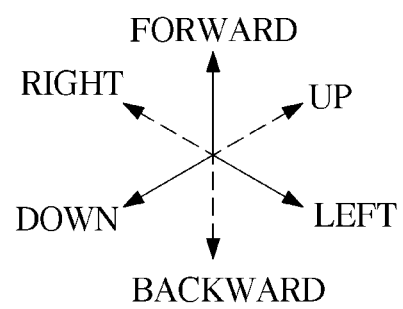
Figure 6:
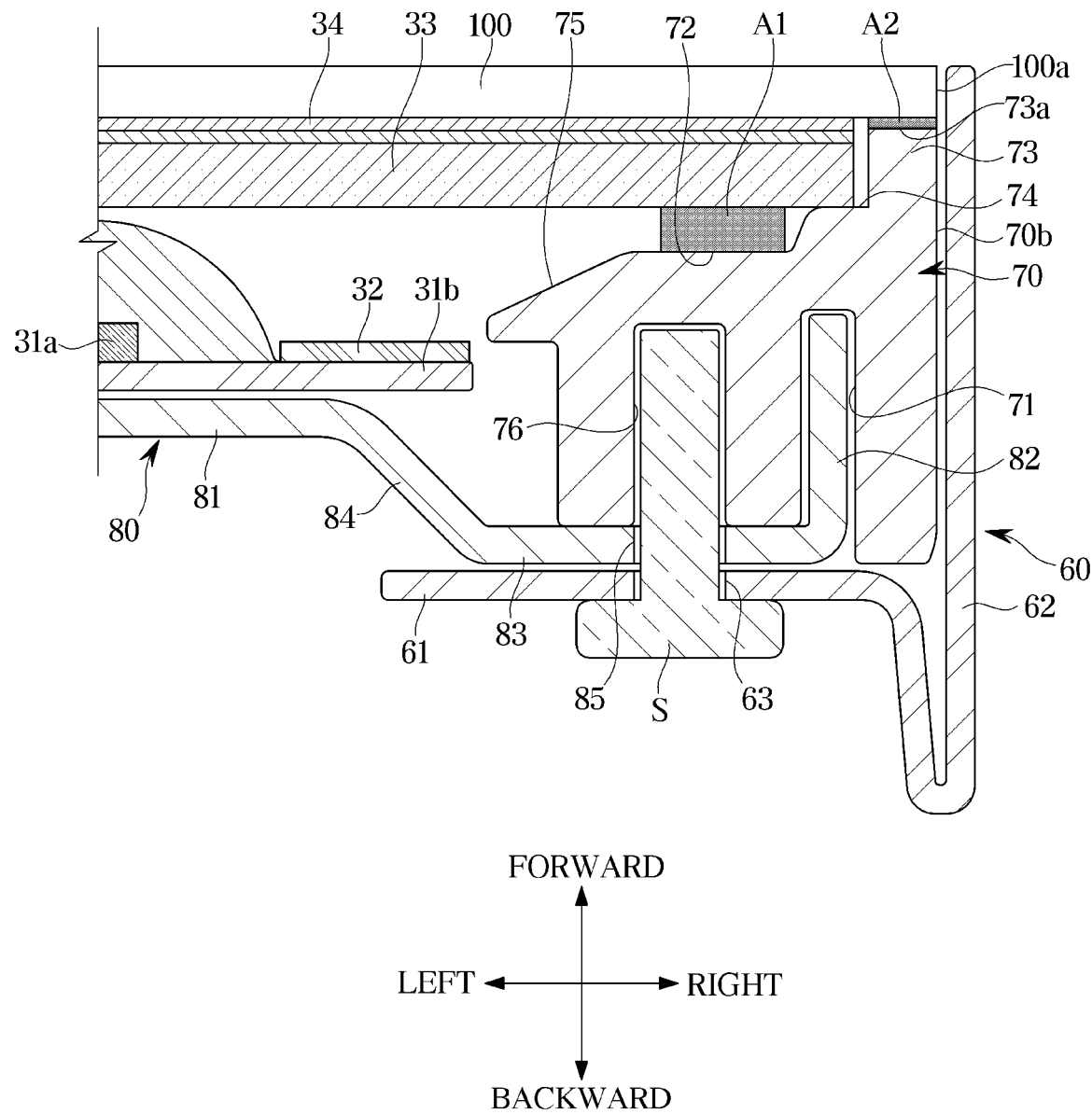
FIG. 6 is a cross-sectional view taken along line A-A of FIG. 1.

FIG. 5 is a cutaway view taken along line A-A of FIG. 1. FIG. 6 is a cross-sectional view taken along line A-A of FIG. 1. FIGS. 5 and 6 are a cutaway view and a cross-sectional view of a right edge portion of the body 10. A left edge portion and an upper edge portion of the body 10 have the same structure as that of the right edge portion of the body 10, and thus a description thereof will be omitted.

Referring to FIGS. 5 and 6, the display apparatus 1 may include the liquid crystal panel 100, the optical device 30, the front frame 60, the middle frame 70, and the rear chassis 80.

The liquid crystal panel 100 and the optical device 30 may be the same as the liquid crystal panel and the optical device previously described with reference to FIGS. 2 and 3, and thus descriptions thereof will be omitted.

The rear chassis 80 may be arranged at the rear of the light source device 30. The light source device 30 may be accommodated between the rear chassis 80 and the liquid crystal panel 100. In addition, the rear chassis 80 may fix the light source device 30, the control assembly 40, and the power assembly 50.

The rear chassis 80 may include a plate shape in which an edge is bent forward. The rear chassis 80 may include a base 81 on which the light source module 31 is installed, and a bent member 82 formed on upper, lower, left, and right edges of the rear chassis 80 to be coupled to the middle frame 70.

The base 81 may be in contact with the substrate 31b to radiate heat, which is generated from a heat generating element such as the light source 31a mounted on the substrate 31b, to the outside. For this, the rear chassis 80 including the base 81 is formed of various metal materials such as aluminum and SUS having high heat transfer efficiency, but is not limited thereto. The rear chassis 80 may be formed of a plastic material such as acrylonitrile butadiene styrene copolymer (ABS).

The bent member 82 may be inserted into an insertion groove 71 formed in the middle frame 70. By inserting the bent member 82 into the insertion groove 71, the rear chassis 80 and the middle frame 70 may be primarily coupled to each other.

The rear chassis 80 may further include a first support member 83 supporting the middle frame 70, and a connection member 84 connecting the first support member 83 to the base 81.

The first support member 83 may be formed between the bent member 82 and the base 81 to support the middle frame 70. The connection member 84 may be provided to connect the first support member 83 to the base 81. The connection member 84 may extend obliquely from one end of the base 81 toward the rear side to be connected to one end of the first support member 83. The bent member 82 may be formed at the other end of the first support member 83.

The light source module 31 may be arranged between the base 81 and the diffuser plate 33, and the middle frame 70 may be arranged between the first support member 83 and the diffuser plate 33/the liquid crystal panel 100. A distance between the base 81 and the liquid crystal panel 100 may be less than a distance between the first support member 83 and the liquid crystal panel 100.

The front frame 60 may include a frame shape including an opening 60a to allow light of the light source device 30 to be provided to the liquid crystal panel 100.

The front frame 60 may be provided to cover side surfaces of the liquid crystal panel 100 and the middle frame 70. The front frame supports the liquid crystal panel by covering a front edge of the liquid crystal panel. The edge of the liquid crystal panel formed by the front frame is called as a bezel, and a size of a screen display region of the liquid crystal panel is reduced due to the bezel. Further, due to the thick bezel, a user's sense of immersion in the image of the display apparatus may be reduced.

The front frame 60 may cover the side surface of the liquid crystal panel 100 and may not cover the front surface of the liquid crystal panel 100. Because the front frame 60 is provided not to cover the screen display region of the liquid crystal panel 100, the size of the screen display region of the liquid crystal panel 100 may not be reduced caused by the front frame 60. Accordingly, it is possible to prevent or suppress the reduction in the size of the screen display region of the liquid crystal panel 100 of the display apparatus 1.

Further, a thickness in the left and right direction of the front frame 60 may be reduced. The thickness in the left and right direction of the front frame 60 may represent a width of the bezel. The front frame 60 covers the side surfaces of the liquid crystal panel 100 and the middle frame 70, and thus even if the front frame 60 is not thick, the front frame 60 may function to cover the side surfaces of the liquid crystal panel 100 and the middle frame 70. Accordingly, it is possible to reduce the width of the bezel of the display apparatus 1 and thus the user's sense of immersion in the image of the display apparatus 1 may be improved.

In the same manner as the front frame 60, the middle frame 70 may include a frame shape including an opening 70a to allow the light of the light source device 30 to be provided to the liquid crystal panel 100.

The middle frame 70 may be provided to be coupled to the rear chassis 80 and the front frame 60. The middle frame 70 may fix the liquid crystal panel 100 as well as fixing the diffuser plate 33 and the optical sheet 34.

The middle frame 70 may be arranged at a position corresponding to the first support member 83 of the rear chassis 80. The middle frame 70 may include the insertion groove 71 into which the bent member 82 of the rear chassis 80 is inserted. By inserting the bent member 82 into the insertion groove 71, the middle frame 70 and the rear chassis 80 may be primarily coupled to each other.

The middle frame 70 may be provided to fix the diffuser plate 33. The middle frame 70 may include a sheet adhesive surface 72. The sheet adhesive surface 72 may be one surface, provided to face the diffuser plate 33, of the middle frame 70.

A first adhesive member A1 may be provided between the sheet adhesive surface 72 and the diffuser plate 33. The first adhesive member A1 may be formed of a transparent material. For example, the first adhesive member A1 may include a pressure sensitive adhesive (PSA) having a light transmittance of 90% or more. Because the first adhesive member A1 is formed of a material having high light transmittance, light emitted from the light source module 31 may pass through the first adhesive member A1 and be incident on the diffuser plate 33. Accordingly, it is possible to prevent the loss of light.

The middle frame 70 may be coupled to the liquid crystal panel 100 to prevent the liquid crystal panel 100 from being separated from the front of the display apparatus 1. The middle frame 70 may include a support protrusion 73 protruding toward the liquid crystal panel 100. The support protrusion 73 may include a panel adhesive surface 73a provided to face the rear surface of the liquid crystal panel 100. A second adhesive member A2 may be provided between the panel adhesive surface 73a and the rear surface of the liquid crystal panel 100. The second adhesive member A2 may be provided to bond the panel adhesive surface 73a of the middle frame 70 to the rear surface of the liquid crystal panel 100. The liquid crystal panel 100 may be fixedly coupled to the middle frame 70 by the second adhesive member A2.

The middle frame 70 may further include a sheet support surface 74 arranged between the support protrusion 73 and the sheet adhesive surface 72. The sheet support surface 74 may protrude toward the diffuser plate 33 from the sheet adhesive surface 72 by about the thickness of the first adhesive member A1. The sheet support surface 74 may be in contact with the diffuser plate 33 so as to support the diffuser plate 33. The support protrusion 73 may protrude from the sheet support surface 74 toward the liquid crystal panel 100. Alternatively, the sheet support surface 74 may not be in contact with the diffuser plate 33 or may be omitted. Based on the omission of the sheet support surface 74, the support protrusion 73 may be formed to protrude from the sheet adhesive surface 72.

The middle frame 70 may include a light guide surface 75. The light guide surface 75 may guide the light, which is emitted from the light source 31a, to be incident on the diffuser plate 33. Particularly, the light guide surface 75 may guide the light, which is emitted from the light source 31a, to be incident on the first adhesive member A1 or to be incident on one side of the diffuser plate 33 in contact with the first adhesive member A1. The light guide surface 75 may be inclined so as not to interfere with a travel path of light. The light guide surface 75 may prevent the middle frame 70 from interfering with the travel path of the light that is emitted from the light source 31a and incident on the diffuser plate 33. An inclined angle of the light guide surface 75 may be determined by applying a light profile emitted from the light source 31a.

For example, in a state in which the light guide surface 75 is not provided or the sheet adhesive surface 72 extends to the substrate 31b, the travel path of the light, which is emitted from the light source 31a and directed toward the edge of the diffuser plate 33, may be blocked by the middle frame 70. The light may be not incident to the edge of the diffuser plate 33 because the travel path of the light is blocked, and thus the luminance of the edge of the display apparatus 1 may be reduced or non-uniform. The light guide surface 75 may provide the travel path of the light so as to allow the light to be incident on the edge of the diffuser plate 33, and thus it is possible to prevent or suppress the luminance deterioration or luminance non-uniformity in the edge of the display apparatus 1.

The middle frame 70 may be provided so as not to protrude to the lateral side of the liquid crystal panel 100. In other words, an outermost surface 70b of the middle frame 70 may be located on the same surface as a side surface 100a of the liquid crystal panel 100 or located lateral-inner side than the side surface 100a of the liquid crystal panel 100. Although the drawings show that the side surface 70b of the middle frame 70 and the side surface 100a of the liquid crystal panel 100 are located on the same surface, the side surface 70b of the middle frame 70 may be located lateral-inner side than the side surface 100a of the liquid crystal panel 100.

The front frame 60 may include a second support member 61 supporting the rear chassis 80 and the middle frame 70, and a sidewall 62 covering the side surfaces of the middle frame 70 and the liquid crystal panel 100.

A thickness of the sidewall 62 may correspond to the width of the bezel of the display apparatus. Because the sidewall 62 of the front frame 60 extends approximately in a straight line along the front and rear direction without extending or protruding laterally (right or left), the bezel may be relatively thin.

The middle frame 70 may be formed in such a way that a member protruding to the outside of the liquid crystal panel 100 is not provided. Because there is no member protruding to the outside of the liquid crystal panel 100, the front frame 60 may be arranged relatively adjacent to the side surface of the liquid crystal panel 100. In addition, because the front frame 60 is provided to cover the side surface of the liquid crystal panel 100 and the side surface of the middle frame 70, the front frame 60 with a relatively small thickness may cover the side surface without difficulty. Accordingly, the thickness of the side wall 62 of the front frame 60 may be provided to be relatively small. Because the size of the bezel corresponds to the thickness of the sidewall 62 of the front frame 60, the width of the bezel of the display apparatus 1 may be reduced by minimizing the thickness of the sidewall 62 of the front frame 60. As the width of the bezel is reduced, the user's immersion in the image of the display apparatus 1 may be improved.

The front frame 60, the rear chassis 80, and the middle frame 70 may be coupled to each other by a fastening member S provided separately. The middle frame 70 may include a fastening groove 76 into which the fastening member S is inserted and coupled. The rear chassis 80 may include a first fastening hole 85 corresponding to the fastening groove 76 and provided to allow the fastening member S to pass therethrough. The second support member 61 of the front frame 60 may include a second fastening hole 63 corresponding to the fastening groove 76 and the first fastening hole 85 and provided to allow the fastening member S to pass therethrough.

The fastening member S may pass through the first fastening hole 85 and the second fastening hole 63 to be fastened to the fastening groove 76. The fastening member S may be screwed into the fastening groove 76. Because the fastening member S is fastened to the fastening groove 76, the front frame 60 may be fixedly coupled to the rear chassis 80. In addition, as the fastening member S is fastened to the fastening groove 76, the front frame 60 may be secondary coupled to the rear chassis 80 and the middle frame 70.

Figure 7:
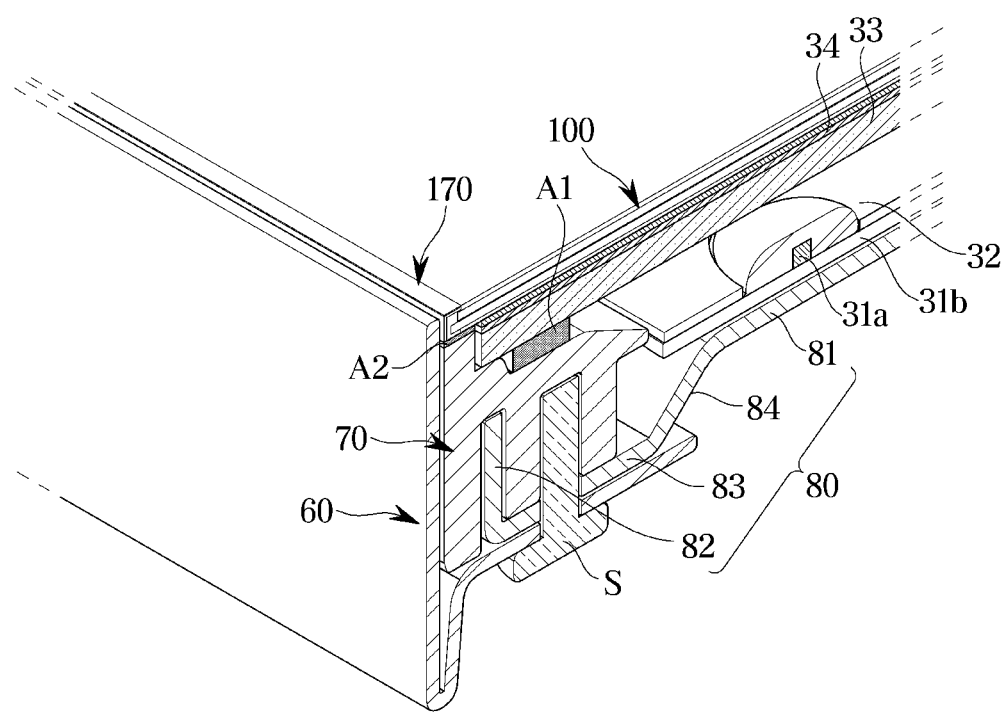
FIG. 7 is a cutaway view taken along line B-B of FIG. 1.
Figure 7:
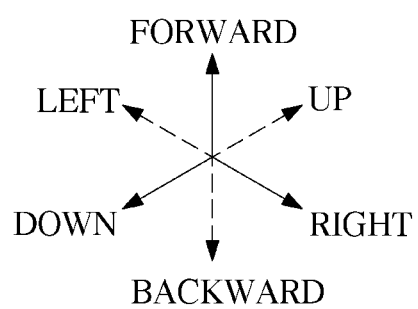
Figure 8:
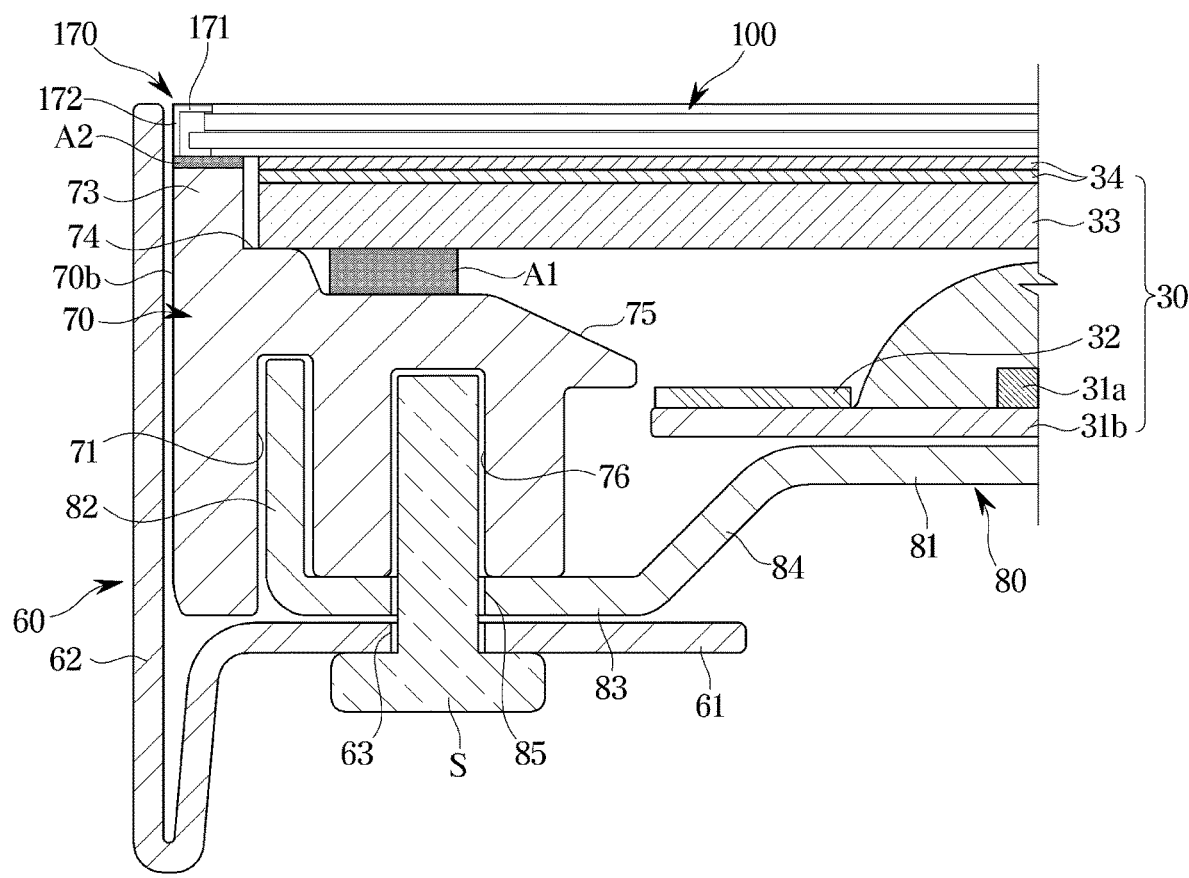
FIG. 8 is a cross-sectional view taken along line B-B of FIG. 1.

FIG. 7 is a cutaway view taken along line B-B of FIG. 1. FIG. 8 is a cross-sectional view taken along line B-B of FIG. 1.

Referring to FIGS. 7 and 8, the display apparatus 1 may include the liquid crystal panel 100, the optical device 30, the front frame 60, the middle frame 70, and the rear chassis 80.

The front frame 60, the middle frame 70, and the rear chassis 80 may be the same as the front frame, the middle frame, and the rear chassis previously described in conjunction with FIGS. 5 and 6.

The cable 160 may be provided in the lower side of the liquid crystal panel 100. The cable 160 may be connected to the protruding member of the second transparent substrate 140.

A lower cover 170 may be provided under the liquid crystal panel 100 to prevent the protruding member of the second transparent substrate 140 and the cable 160 from being visually recognized from the outside.

The lower cover 170 may include a first cover member 171 extending from the edge of the liquid crystal panel 100 toward the front frame 60 arranged thereunder and a second cover member 172 extending from one end of the first cover member 171 toward the middle frame 70 arranged on the rear side thereof. The first cover member 171 and the second cover member 172 may be formed in a shape of the letter "L".

The first cover member 171 may be fixed to the liquid crystal panel 100, and the second cover member 172 may be fixed to the middle frame 70. Accordingly, the lower cover 170 may be fixed to the middle frame 70 together with the liquid crystal panel 100.

The lower cover 170, in which a cross-section is in the L-shape, may cover the front and lower sides of the lower end of the liquid crystal panel 100.

The lower cover 170 may be formed of a transparent material, and an opaque pigment or dye may be applied to an outer surface of the lower cover 170. Due to the pigment or dye applied to the outer surface, light may not pass through the lower cover 170, and the protruding member of the second transparent substrate 140 and the cable 160 may not be visually recognized from the outside.

The cable 160 connected to the liquid crystal panel 100 may pass through a space between the liquid crystal panel 100 and the lower cover 170, and may extend to the control assembly 40 provided on the rear surface of the rear chassis 80.

Hereinafter an arrangement and coupling of the lower cover 170 will be described.

Figure 9:
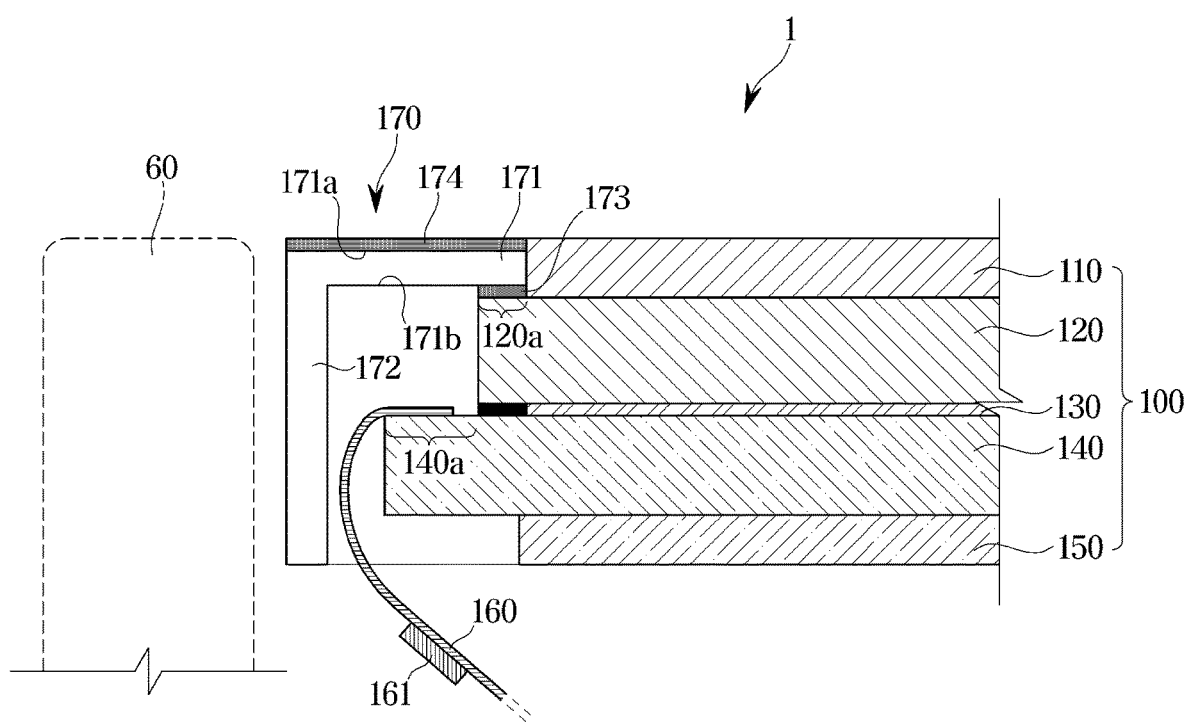
FIG. 9 is a view illustrating an example of a lower end of the liquid crystal panel included in the display apparatus according an embodiment of the disclosure.
Figure 9:
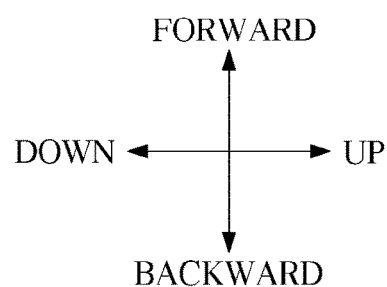
Figure 10:
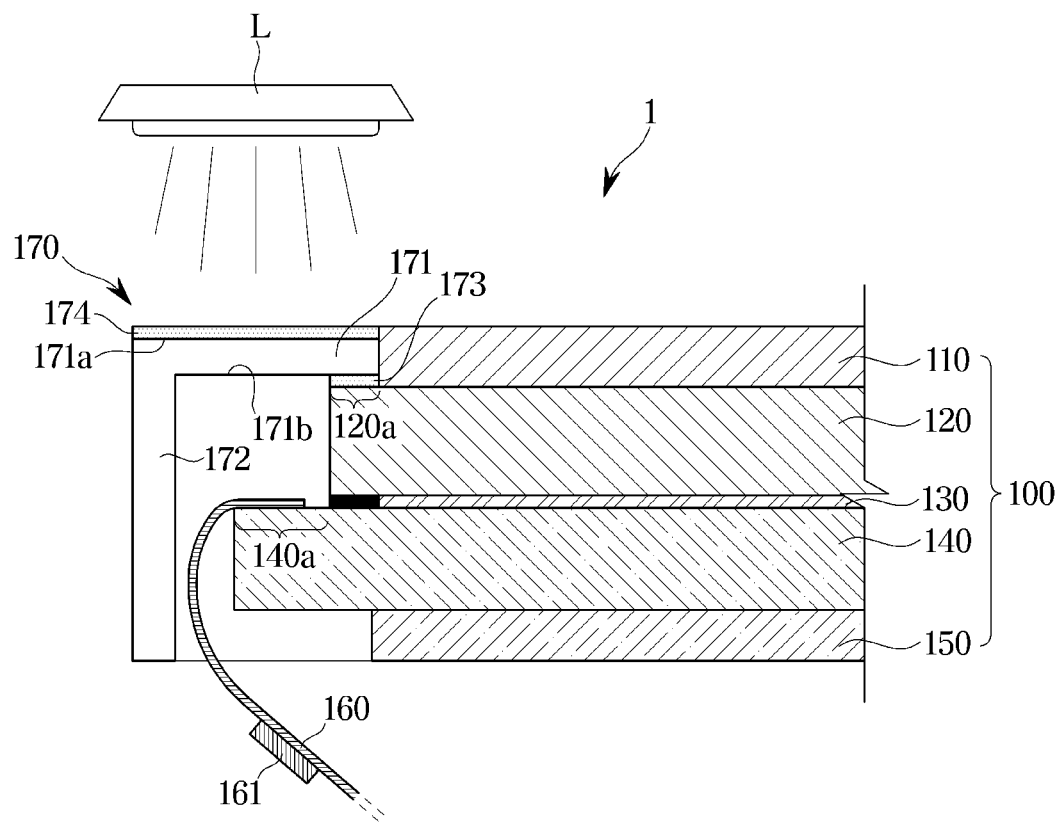
FIG. 10 is a view illustrating an example of emitting light to fix a lower cover shown in FIG. 9 to the liquid crystal panel.
Figure 10:
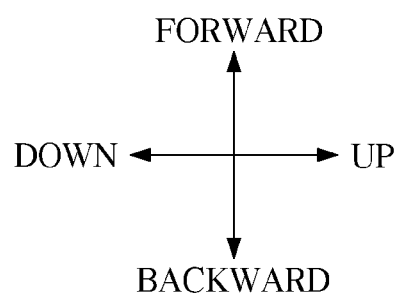

FIG. 9 is a view illustrating an example of a lower end of the liquid crystal panel included in the display apparatus according an embodiment of the disclosure. FIG. 10 is a view illustrating an example of emitting light to fix a lower cover shown in FIG. 9 to the liquid crystal panel.

Referring to FIGS. 9 and 10, the display apparatus 1 may include the first polarizing film 110, the first transparent substrate 120, the liquid crystal layer 130, the second transparent substrate 140, the second polarizing film 150, the cable 160, and the lower cover 170. The first polarizing film 110, the first transparent substrate 120, the liquid crystal layer 130, the second transparent substrate 140, the second polarizing film 150, and the cable 160 may form the liquid crystal panel 100.

The first polarizing film 110, the first transparent substrate 120, the liquid crystal layer 130, the second transparent substrate 140, and the second polarizing film 150 may be sequentially laminated from the front side to the rear side.

The second transparent substrate 140 may protrude further downward than the liquid crystal layer 130 and the first transparent substrate 120. The cable 160 may be attached to a protruding member 140a of the second transparent substrate 140. The cable 160 may extend rearwardly from an upper edge of the protruding member 140a of the second transparent substrate 140. For example, the cable 160 may extend to the control assembly 40. The panel driver 161 configured to process image data may be provided on the cable 160. The panel driver 161 may process image data and transmit an electrical signal corresponding to the image data to the second transparent substrate 140 through the cable 160.

The first transparent substrate 120 may protrude further downward than the first polarizing film 110. The lower cover 170 may be adhered to a protruding member 120a of the first transparent substrate 120, which protrudes further than the first polarizing film 110, by a photocuring material 173.

The photocuring material 173 may be provided between the lower cover 170 and the first transparent substrate 120 and cured by the light, which is emitted to the photocuring material 173, so as to fix the lower cover 170 to the first transparent substrate 120.

The photocuring material 173 may include an ultraviolet curing agent that is cured by ultraviolet rays having a wavelength of between 250 nm and 450 nm. The photocuring material 173 may include a base such as acrylic, silicone, urethane, acrylate, or epoxy, and a photo-initiator that induces polymerization by light.

The photocuring material 173 that is uncured may be applied, coated, or printed on the protruding member 120a of the first transparent substrate 120. In addition, a film including the uncured-photocuring material 173 may be attached to the protruding member 120a.

The lower cover 170 may cover the front and lower sides of the lower edge of the liquid crystal panel 100. The lower cover 170 may be formed of a transparent material that transmits at least a portion of the incident light. For example, the lower cover 170 may include acrylonitrile butadiene styrene copolymer (ABS), polycarbonate (PC), polypropylene (PP), or poly ethylene (PE).

The lower cover 170 may include the first cover member 171 and the second cover member 172.

The first cover member 171 may extend downwardly from the first polarizing film 110 to the vicinity of the front frame 60. The first cover member 171 may protect the inside of the display apparatus 1 or the liquid crystal panel 100 from external forces. Further, the first cover member 171 may block light to prevent the inside of the display apparatus 1 or the inside of the liquid crystal panel 100 from being visually recognized from the outside.

A blackening material 174 that is blackened may be provided on an outer surface 171a of the first cover member 171. The blackening material 174 may include a photosensitizer that is blackened by light.

The blackening material 174 that is unblackened may be transparent or translucent. In other words, the unblackened-blackening material 174 may pass at least a portion of the incident light.

The unblackened-blackening material 174 may be blackened by light, and the blackened-blackening material 174 may block light or have extremely small light transmittance. Due to the blackened-blackening material 174, light may not pass through the first cover member 171, and the inside of the first cover member 171 may not be visually recognized from the outside.

The blackening material 174 may include an ultraviolet light-blackening material that is blackened by ultraviolet rays having a wavelength of between 250 nm and 450 nm. The blackening material 174 may include a silver halide such as silver chloride (AgCl), silver bromide (AgBr), or silver iodide (AgI), and a solvent in which the silver halide is dissolved. The silver halide exposed to ultraviolet rays may be blackened, and the blackened silver halide may block light or have an extremely small light transmittance.

The unblackened-blackening material 174 may be applied, coated, or printed on the outer surface 171a of the first cover member 171. Alternatively, the film including the unblackened-blackening material 174 may be attached to the first cover member 171.

Thereafter, the blackening material 174 may be blackened by exposure to light such as ultraviolet rays.

The second cover member 172 may extend rearwardly from one end, which is adjacent to the front frame 60, of the first cover member 171. The second cover member 172 may protect the lower end of the liquid crystal panel 100 from external force, and may guide the cable 160 of the liquid crystal panel 100 to the rear side.

As mentioned above, chemical/physical properties of both the photocuring material 173 and the blackening material 174 may be changed by light (for example, ultraviolet rays). For example, the photocuring material 173 may be cured by light, and the blackening material 174 may be blackened by light.

Light may be directly emitted to the photocuring material 173 and the blackening material 174 at the same time.

As shown in FIG. 10, the lower cover 170, on which the unblackened-blackening material 174 is applied, coated, or printed, may be arranged on the protruding member 120a of the first transparent substrate 120. The uncured-photocuring material 173 may be provided between the lower cover 170 and the protruding member 120a. The lower cover 170 may be temporarily fixed to the first transparent substrate 120 by an external device or the like.

During the lower cover 170 is temporarily fixed to the first transparent substrate 120, a lamp L may be positioned in front of the lower cover 170. Light (for example, ultraviolet rays) may be emitted toward the lower cover 170 by the lamp L positioned in front of the lower cover 170.

The light of the lamp L may be incident on the blackening material 174 of the first cover member 171. At the same time, the light may pass through the unblackened-blackening material 174 and the transparent lower cover 170 and then incident on the photocuring material 173.

The blackening material 174 of the first cover member 171 may be blackened by the light of lamp L. The photocuring material 173 of the protruding member 120a of the 120 may be cured by the light of the lamp L.

In this case, the curing of the photocuring material 173 by light may proceed faster than the blackening of the blackening material 174. Accordingly, the photocuring material 173 may be sufficiently cured first before the blackening material 174 is completely blackened.

As described above, by applying or coating the blackening material 174 on the transparent lower cover 170, light may be directly emitted to the blackening material 174 and the photocuring material 173. Accordingly, the light may be uniformly emitted to the photocuring material 173, and the photocuring material 173 may be uniformly cured. In addition, by the blackening material 174 that is blackened by light, it is possible to prevent the inside of the display apparatus 1 from being visually recognized.

The blackening of the blackening material 174 and the curing of the photocuring material 173 may be simultaneously performed through a single light emission process (ultraviolet emission process). Accordingly, it is possible to simplify a manufacturing process of the display apparatus 1.

Figure 11:
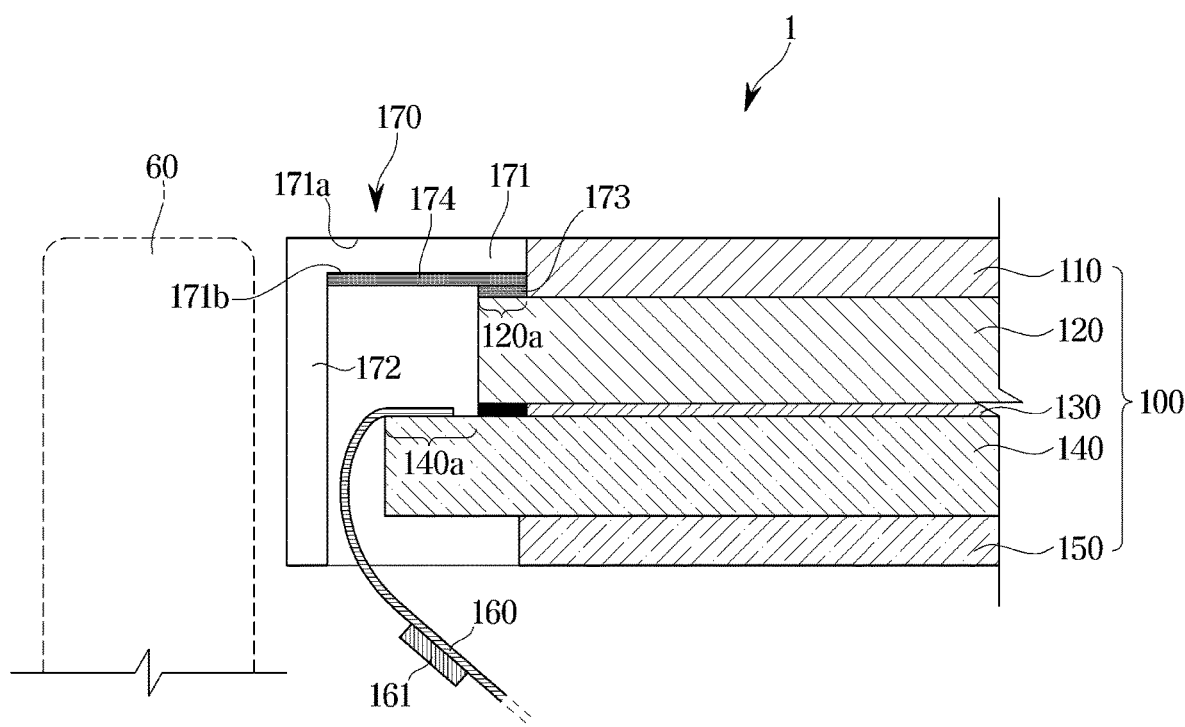
FIG. 11 is a view illustrating an example of the lower end of the liquid crystal panel included in the display apparatus according an embodiment of the disclosure.
Figure 11:
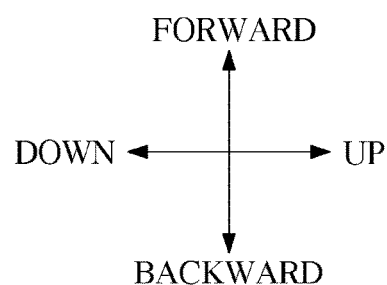

FIG. 11 is a view illustrating an example of the lower end of the liquid crystal panel included in the display apparatus according an embodiment of the disclosure.

Referring to FIG. 11, the display apparatus 1 may include a liquid crystal panel 100 and a lower cover 170. The liquid crystal panel 100 may include a first polarizing film 110, a first transparent substrate 120, a liquid crystal layer 130, a second transparent substrate 140, a second polarizing film 150, and a cable 160.

The arrangement of the first polarizing film 110, the first transparent substrate 120, the liquid crystal layer 130, the second transparent substrate 140, the second polarizing film 150, and the cable 160 may be the same as the arrangement of the first polarizing film, the first transparent substrate, the liquid crystal layer, the second transparent substrate, the second polarizing film and the cable described in FIGS. 9 and 10.

For example, the cable 160 may be attached to a protruding member 140a in which the second transparent substrate 140 protrudes further than the first transparent substrate 120. A lower cover 170 may be attached to a protruding member 120a, in which the first transparent substrate 120 protrudes further than the first polarizing film 110, by a photocuring material 173.

The uncured-photocuring material 173 may be applied, coated, or printed on the protruding member 120a of the first transparent substrate 120, and cured by light so as to fix the lower cover 170 to the first transparent substrate 120.

The lower cover 170 may cover the front and lower sides of the lower edge of the liquid crystal panel 100, and the lower cover 170 may include a first cover member 171 extending downward from the second polarizing film 150 and a second cover member 172 extending rearward from one end of the first cover member 171.

A blackened-blackening material 174 may be provided on an inner surface 171b of the first cover member 171. The blackening material 174 may be blackened by light such as ultraviolet light, and the blackened-blackening material 174 may block light or have extremely low light transmittance.

The unblackened-blackening material 174 may be applied, coated, or printed on an outer surface 171a of the first cover member 171, and blackened by exposure to light such as ultraviolet rays. The blackened-blackening material 174 may block light incident on the first cover member 171.

Light (for example, ultraviolet rays) may be simultaneously emitted to the photocuring material 173 and the blackening material 174.

As described above in FIG. 10, during the lower cover 170 is temporarily fixed to the first transparent substrate 120, light (for example, ultraviolet rays) may be emitted toward the lower cover 170.

The light emitted from the lamp L may not only be incident on the blackening material 174, but may also be incident on the photocuring material 173 by passing through the blackening material 174. The light may blacken the blackening material 174 and simultaneously, cure the photocuring material 173. Particularly, the light of the lamp L may be directly emitted to the photocuring material 173, and thus the photocuring material 173 may be uniformly cured.

As mentioned above, light may be emitted to both the photocuring material 173 and the blackening material 174 through a single process. Particularly, the light of the lamp L may be directly emitted to the photocuring material 173, and thus the photocuring material 173 may be uniformly cured.

Because the blackening material 174 is provided on the inner surface 171b of the first cover member 171, the blackening material 174 may not be directly exposed to the outside. Accordingly, it is possible to suppress that a seam between the first polarizing film 110 and the lower cover 170 is visually recognized, and it is possible to provide a visual sense of unity between the first polarizing film 110 and the lower cover 170 to the user. Accordingly, it is difficult for a user to recognize the seam between the first polarizing film 110 and the lower cover 170, and the user may recognize that the screen 11 of the display apparatus 1 extends.

Figure 12:
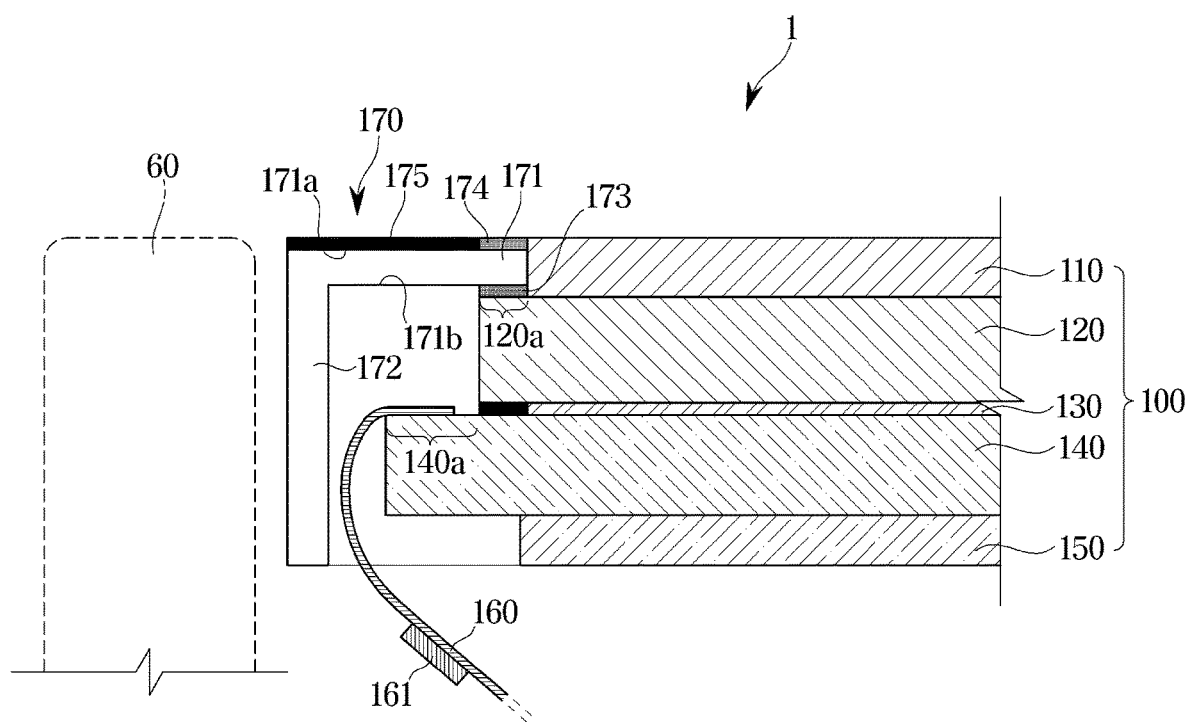
FIG. 12 is a view illustrating an example of the lower end of the liquid crystal panel included in the display apparatus according an embodiment of the disclosure.
Figure 12:
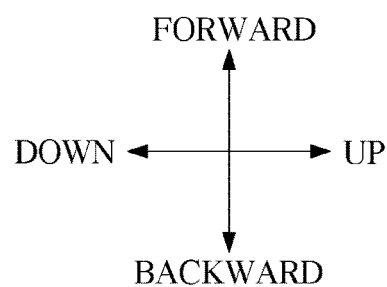
Figure 13:
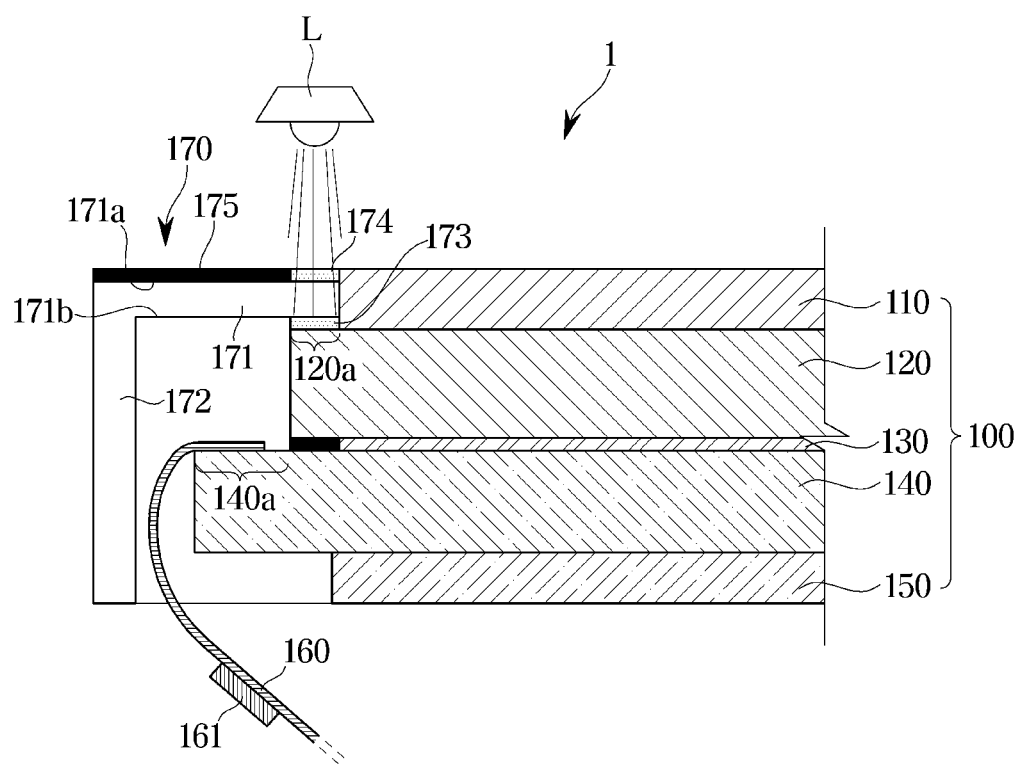
FIG. 13 is a view illustrating an example of emitting light to fix a lower cover shown in FIG. 12 to the liquid crystal panel.
Figure 13:
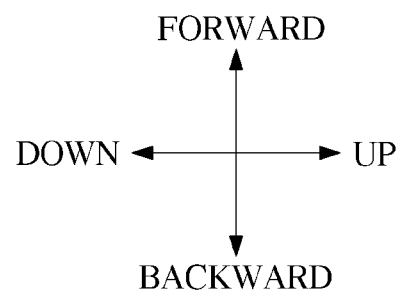

FIG. 12 is a view illustrating an example of the lower end of the liquid crystal panel included in the display apparatus according an embodiment of the disclosure. FIG. 13 is a view illustrating an example of emitting light to fix a lower cover shown in FIG. 12 to the liquid crystal panel Referring to FIGS. 12 and 13, the display apparatus 1 may include a liquid crystal panel 100 and a lower cover 170. The liquid crystal panel 100 may include a first polarizing film 110, a first transparent substrate 120, a liquid crystal layer 130, a second transparent substrate 140, a second polarizing film 150, and a cable 160.

The arrangement of the first polarizing film 110, the first transparent substrate 120, the liquid crystal layer 130, the second transparent substrate 140, the second polarizing film 150, and the cable 160 may be the same as the arrangement of the first polarizing film, the first transparent substrate, the liquid crystal layer, the second transparent substrate, the second polarizing film and the cable described in FIGS. 9 and 10.

For example, the cable 160 may be attached to a protruding member 140a in which the second transparent substrate 140 protrudes further than the first transparent substrate 120. A lower cover 170 may be attached to a protruding member 120a, in which the first transparent substrate 120 protrudes further than the first polarizing film 110, by a photocuring material 173.

The uncured-photocuring material 173 may be applied, coated, or printed on the protruding member 120a of the first transparent substrate 120, and cured by light so as to fix the lower cover 170 to the first transparent substrate 120.

The lower cover 170 may cover the front and lower sides of the lower edge of the liquid crystal panel 100, and the lower cover 170 may include a first cover member 171 extending downward from the second polarizing film 150 and a second cover member 172 extending rearward from one end of the first cover member 171.

A black paint 175 and a blackened-blackening material 174 may be provided on an outer surface 171a of the first cover member 171.

The blackening material 174 may be blackened by light such as ultraviolet light, and the blackened-blackening material 174 may block light or have extremely low light transmittance.

A paint may be defined as a material that is in a liquid state and coated on a surface of an object so as to form a film in a solid or semisolid state. The paint may include pigments, resins, additives and solvents.

The black paint 175 may include a black pigment, and may absorb or reflect incident light. In other words, the black paint 175 may block light or have extremely low light transmittance. The transmittance of the black paint 175 may depend on a concentration of the black pigment included in the black paint 175.

In addition, the concentration of the black pigment included in the black paint 175 may be adjusted to prevent the black paint 175 being easily distinguished from the blackening material 174.

The blackened-blackening material 174 may be provided in a region, which corresponds to the photocuring material 173, in the outer surface 171a of the first cover member 171, and the black paint 175 may be provided in a region in which the blackened-blackening material 174 is not provided. For example, as shown in FIG. 12, the blackened-blackening material 174 may be provided in an upper portion (an edge portion, adjacent to the first polarizing film, of the first cover member) in the outer surface 171a of the first cover member 171, and the black paint 175 may be provided in a lower portion of the outer surface 171a of the first cover member 171.

The black paint 175 may be applied to the outer surface 171a of the first cover member 171, and the unblackened-blackening material 174 may be applied, coated or printed on a region, in which the black paint 175 is not applied, in the outer surface 171a of the first cover member 171.

Thereafter, light (for example, ultraviolet rays) may be simultaneously emitted to the photocuring material 173 and the blackening material 174 to cure the photocuring material 173 and to blacken the blackening material 174.

As shown in FIG. 13, during the lower cover 170 is temporarily fixed to the first transparent substrate 120, light (for example, ultraviolet rays) of the lamp L in front of the lower cover 170 may be emitted toward a partial region (a region on which the blackening material is applied or coated) of the lower cover 170.

The light emitted from the lamp L may not only be incident on the blackening material 174, but may also be incident on the photocuring material 173 by passing through the blackening material 174. The light may blacken the blackening material 174 and simultaneously cure the photocuring material 173.

As mentioned above, the light may be emitted to both the photocuring material 173 and the blackening material 174 through a single process. Particularly, the light of the lamp L may be directly emitted to the photocuring material 173, and thus the photocuring material 173 may be uniformly cured.

Because the blackening material 174 is provided in a region of the outer surface 171a of the first cover member 171, the light may be selectively emitted to only a region corresponding to the blackening material 174 and the photocuring material 173. Accordingly, it is possible to prevent or suppress a damage in the liquid crystal panel 100 (for example, the polarizing film or the liquid crystal layer) or a change in physical/optical properties of the liquid crystal panel 100 caused by light such as ultraviolet rays. Accordingly, it is possible to reduce a defect rate of the display apparatus 1 and to increase a productivity of the display apparatus 1.

Figure 14:
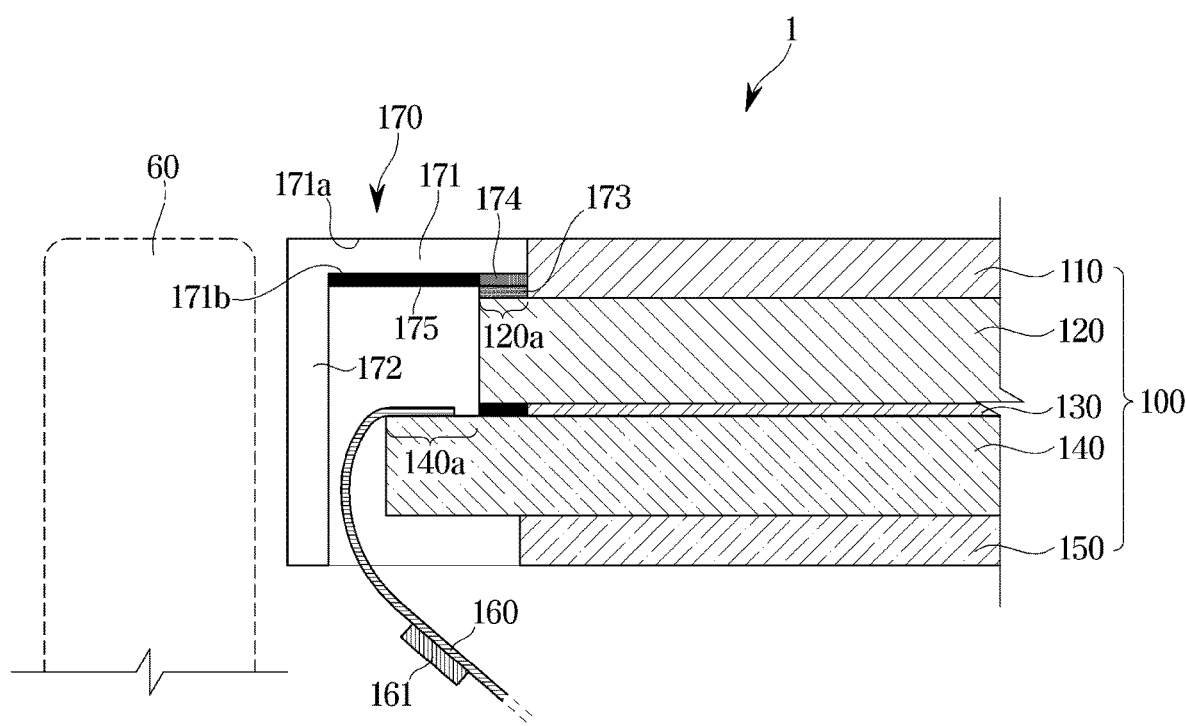
FIG. 14 is a view illustrating an example of the lower end of the liquid crystal panel included in the display apparatus according an embodiment of the disclosure.
Figure 14:
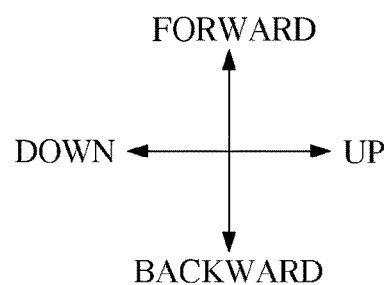

FIG. 14 is a view illustrating an example of the lower end of the liquid crystal panel included in the display apparatus according an embodiment of the disclosure.

Referring to FIG. 14, the display apparatus 1 may include a liquid crystal panel 100 and a lower cover 170. The liquid crystal panel 100 may include a first polarizing film 110, a first transparent substrate 120, a liquid crystal layer 130, a second transparent substrate 140, a second polarizing film 150, and a cable 160.

The arrangement of the first polarizing film 110, the first transparent substrate 120, the liquid crystal layer 130, the second transparent substrate 140, the second polarizing film 150, and the cable 160 may be the same as the arrangement of the first polarizing film, the first transparent substrate, the liquid crystal layer, the second transparent substrate, the second polarizing film and the cable described in FIGS. 9 and 10.

For example, the cable 160 may be attached to a protruding member 140a in which the second transparent substrate 140 protrudes further than the first transparent substrate 120. A lower cover 170 may be attached to a protruding member 120a, in which the first transparent substrate 120 protrudes further than the first polarizing film 110, by a photocuring material 173.

The uncured-photocuring material 173 may be applied, coated, or printed on the protruding member 120a of the first transparent substrate 120, and cured by light so as to fix the lower cover 170 to the first transparent substrate 120.

The lower cover 170 may cover the front and lower sides of the lower edge of the liquid crystal panel 100, and the lower cover 170 may include a first cover member 171 extending downward from the second polarizing film 150 and a second cover member 172 extending rearward from one end of the first cover member 171.

A black paint 175 and a blackened-blackening material 174 may be provided on an inner surface 171b of the first cover member 171. The black paint 175 may include a black pigment, and may block light or have extremely low light transmittance. The blackening material 174 may be blackened by light such as ultraviolet rays, and the blackened-blackening material 174 may block light or have extremely low light transmittance.

The blackened-blackening material 174 may be provided in a region, which corresponds to the photocuring material 173, in the inner surface 171b of the first cover member 171, and the black paint 175 may be provided in a region in which the blackened-blackening material 174 is not provided. For example, as shown in FIG. 14, the blackened-blackening material 174 may be provided in an upper portion (an edge portion, adjacent to the first polarizing film, of the first cover member) of the inner surface 171b of the first cover member 171 and the black paint 175 may be provided in a lower portion of the inner surface 171b of the first cover member 171.

The unblackened-blackening material 174 on the inner surface 171b of the first cover member 171 may be blackened by exposure to light such as ultraviolet rays.

In order to cure the photocuring material 173 and blacken the light-blackening material 174, light (for example, ultraviolet rays) may be simultaneously emitted to the photocuring material 173 and the blackening material 174.

As shown in FIG. 13, during the lower cover 170 is temporarily fixed to the first transparent substrate 120, the light (for example, ultraviolet rays) of the lamp L in front of the lower cover 170 may be emitted toward a partial region (a region on which the blackening material is applied or coated) of the lower cover 170.

The light emitted from the lamp L may not only blacken the blackening material 174, but may also cure the photocuring material 173.

As mentioned above, the light may be emitted to both the photocuring material 173 and the blackening material 174 through a single process. Particularly, the light of the lamp L may be directly emitted to the photocuring material 173, and thus the photocuring material 173 may be uniformly cured.

Because the blackening material 174 is provided on the inner surface 171b of the first cover member 171, the blackening material 174 may not be directly exposed to the outside. Accordingly, it is possible to suppress that a seam between the first polarizing film 110 and the lower cover 170 is visually recognized, and it is possible to provide a visual sense of unity between the first polarizing film 110 and the lower cover 170 to the user.

Because the blackening material 174 is provided in a region of the inner surface 171b of the first cover member 171, light may be selectively emitted to only a region corresponding to the blackening material 174 and the photocuring material 173. Accordingly, it is possible to prevent or suppress a damage in the liquid crystal panel 100 (for example, the polarizing film or the liquid crystal layer) or a change in physical/optical properties of the liquid crystal panel 100 caused by light such as ultraviolet rays.

Figure 15:
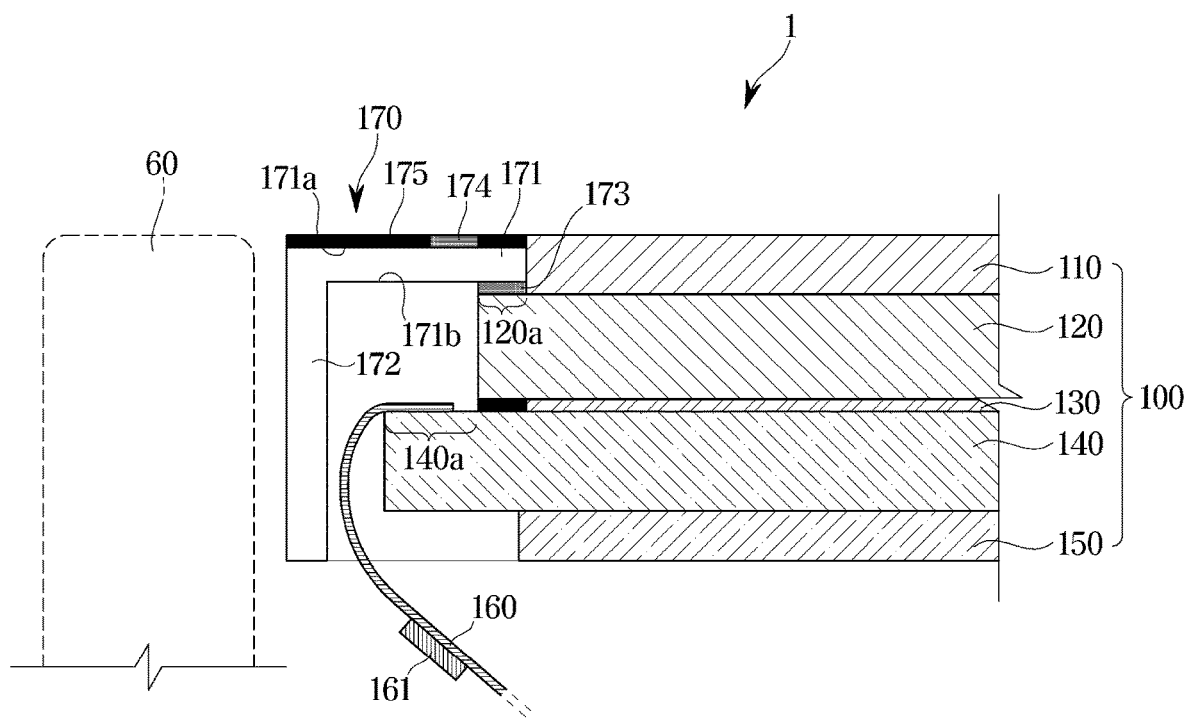
FIG. 15 is a view illustrating an example of the lower end of the liquid crystal panel included in the display apparatus according an embodiment of the disclosure.
Figure 15:
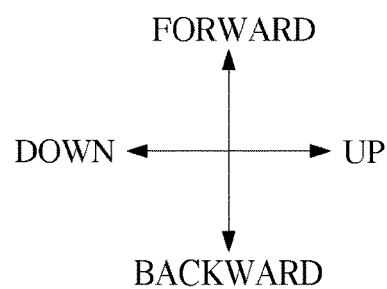
Figure 16:
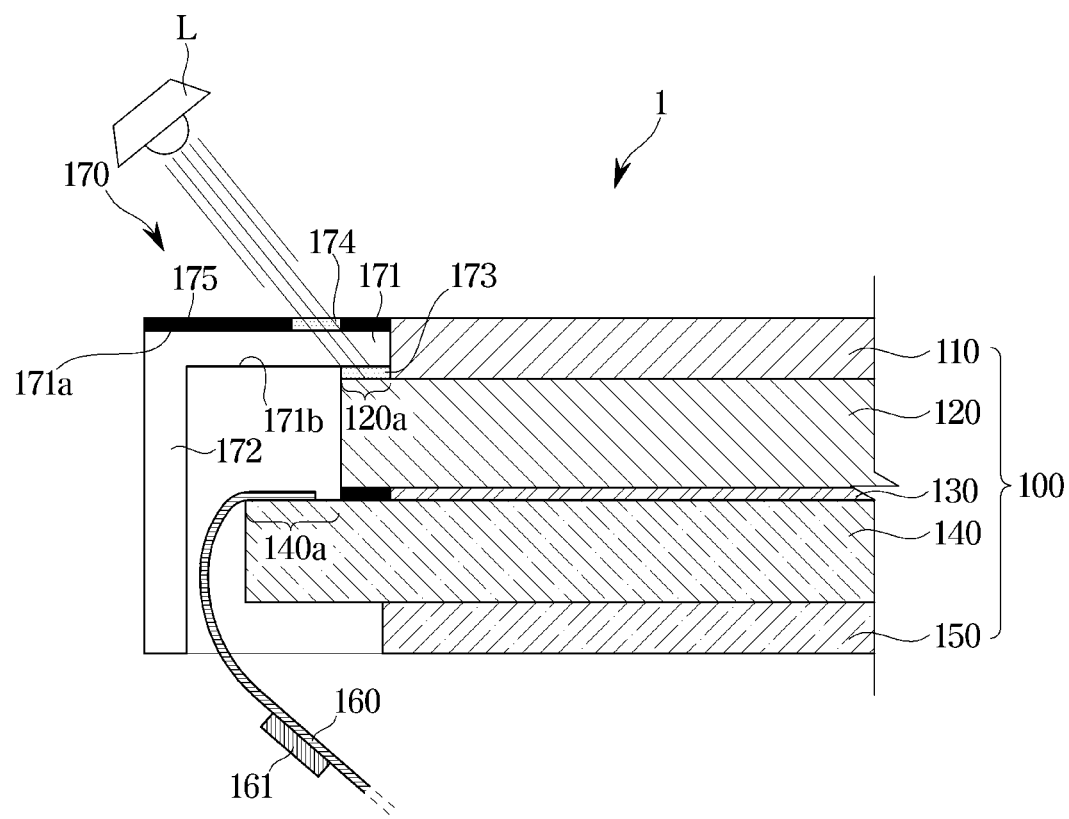
FIG. 16 is a view illustrating an example of emitting light to fix a lower cover shown in FIG. 15 to the liquid crystal panel.
Figure 16:
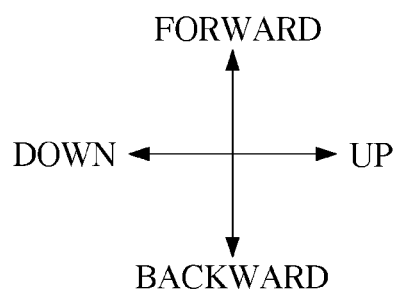

FIG. 15 is a view illustrating an example of the lower end of the liquid crystal panel included in the display apparatus according an embodiment of the disclosure. FIG. 16 is a view illustrating an example of emitting light to fix a lower cover shown in FIG. 15 to the liquid crystal panel.

Referring to FIGS. 15 and 16, the display apparatus 1 may include a liquid crystal panel 100 and a lower cover 170. The liquid crystal panel 100 may include a first polarizing film 110, a first transparent substrate 120, a liquid crystal layer 130, a second transparent substrate 140, a second polarizing film 150, and a cable 160.

The arrangement of the first polarizing film 110, the first transparent substrate 120, the liquid crystal layer 130, the second transparent substrate 140, the second polarizing film 150, and the cable 160 may be the same as the arrangement of the first polarizing film, the first transparent substrate, the liquid crystal layer, the second transparent substrate, the second polarizing film and the cable described in FIGS. 9 and 10.

For example, the cable 160 may be attached to a protruding member 140a in which the second transparent substrate 140 protrudes further than the first transparent substrate 120. A lower cover 170 may be attached to a protruding member 120a, in which the first transparent substrate 120 protrudes further than the first polarizing film 110, by a photocuring material 173.

The uncured-photocuring material 173 may be applied, coated, or printed on the protruding member 120a of the first transparent substrate 120, and cured by light so as to fix the lower cover 170 to the first transparent substrate 120.

The lower cover 170 may cover the front and lower sides of the lower edge of the liquid crystal panel 100, and the lower cover 170 may include a first cover member 171 extending downward from the second polarizing film 150 and a second cover member 172 extending rearward from one end of the first cover member 171.

A black paint 175 and a blackened-blackening material 174 may be provided on an outer surface 171a of the first cover member 171. The black paint 175 may include a black pigment, and may block light or have extremely low light transmittance. The blackening material 174 may be blackened by light such as ultraviolet rays, and the blackened-blackening material 174 may block light or have extremely low light transmittance.

The black paint 175 may be provided on an upper end and lower end of the outer surface 171a of the first cover member 171, and the blackened-blackening material may be provided in a central portion of the outer surface 171a of the first cover member 171. For example, as shown in FIG. 15, a region, in which the blackened-blackening material 174 is provided, may not overlap a region in which the photocuring material 173 is provided, or only a part of a region in which the blackened-blackening material 174 is provided may overlap a region in which the photocuring material 173 is provided.

The black paint 175 may be applied to the outer surface 171a of the first cover member 171, and the unblackened-blackening material 174 may be applied, coated, or printed on a region, in which the black paint 175 is not applied, in the outer surface 171a of the first cover member 171.

Light (for example, ultraviolet rays) may be simultaneously emitted to the photocuring material 173 and the blackening material 174 to cure the photocuring material 173 and to blacken the blackening material 174.

As shown in FIG. 16, during the lower cover 170 is temporarily fixed to the first transparent substrate 120, the light of the lamp L in front of the lower cover 170 may be emitted obliquely toward a region of the lower cover 170.

As described above, the region, on which the blackening material 174 is applied or coated, may not be overlapped with the region in which the photocuring material 173 is provided, or only a part of a region on which the blackening material 174 is applied or coated may be overlapped with the region in which the photocuring material 173 is provided. Because the region, on which the blackening material 174 is applied or coated, is not overlapped with the region in which the photocuring material 173 is provided, the lamp L may emit light at an angle so as to emit the light toward both of the blackening material 174 and the photocuring material 173. For example, the lamp L may emit light from below the region, on which the blackening material 174 is applied or coated, toward the region, on which the blackening material 174 is applied or coated, and an angle between an axis of the light emitted from the lamp L and the outer surface 171a of the lower cover 170 may be less than 90 degrees.

Because the lamp L emits the light at an angle, the light emitted by the lamp L may not only be incident on the blackening material 174 but also be incident on the photocuring material 173 by passing through the blackening material 174. The light may cure the photocuring material 173 and blacken the blackening material 174 at the same time.

As mentioned above, the light may be emitted to both the photocuring material 173 and the blackening material 174 through a single process. Particularly, the light of the lamp L may be directly emitted to the photocuring material 173, and thus the photocuring material 173 may be uniformly cured.

The black paint 175 may be applied or coated on a region, which is adjacent to the first polarizing film 110, in the first cover member 171, and the blackening material 174 may be applied or coated on a region spaced apart from the first polarizing film 110. In addition, the light of the lamp L may be emitted to the region spaced apart from the first polarizing film 110. Therefore, as for the light of the lamp L, it is possible to prevent or suppress that ultraviolet rays are emitted to the first polarizing film 110 and it is possible to prevent or suppress that the first polarizing film 110 is damaged by ultraviolet rays.

Figure 17:
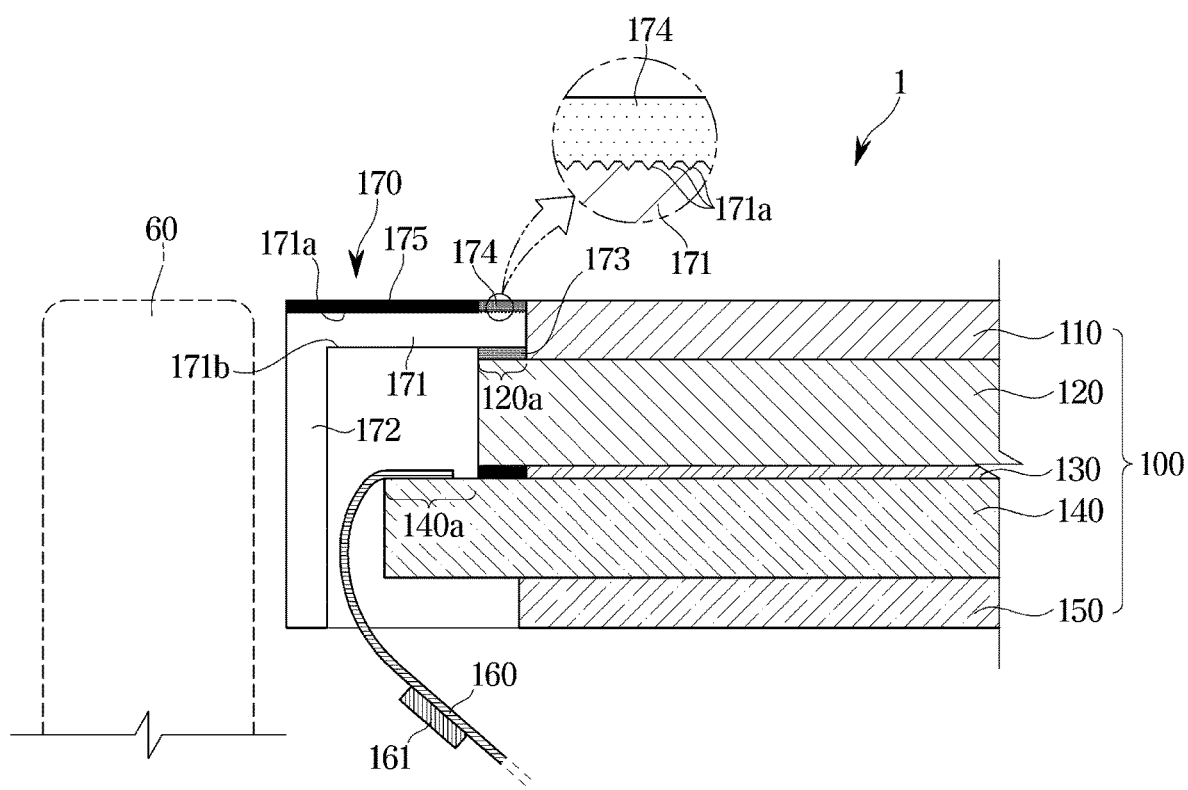
FIG. 17 is a view illustrating an example of the lower end of the liquid crystal panel included in the display apparatus according an embodiment of the disclosure.
Figure 17:
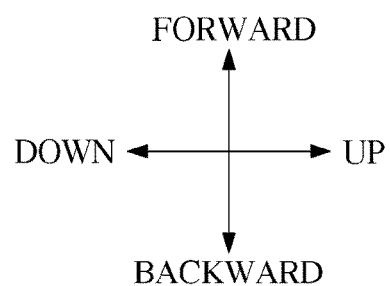
Figure 18:
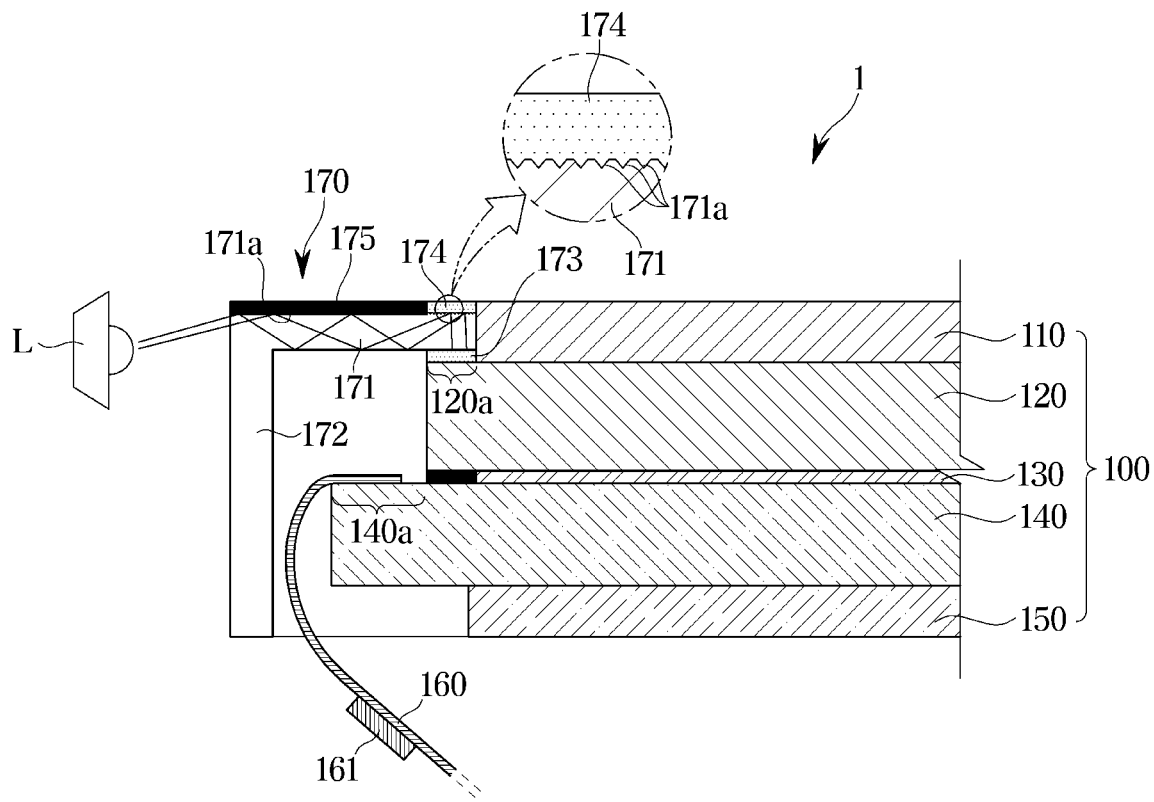
FIG. 18 is a view illustrating an example of emitting light to fix a lower cover shown in FIG. 17 to the liquid crystal panel.
Figure 18:
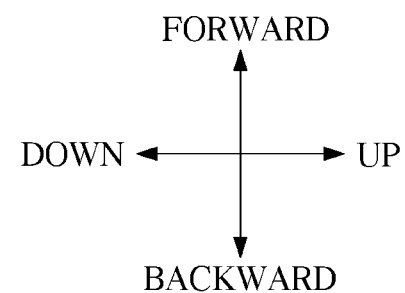

FIG. 17 is a view illustrating an example of the lower end of the liquid crystal panel included in the display apparatus according an embodiment of the disclosure. FIG. 18 is a view illustrating an example of emitting light to fix a lower cover shown in FIG. 15 to the liquid crystal panel.

Referring to FIGS. 17 and 18, the display apparatus 1 may include a liquid crystal panel 100 and a lower cover 170. The liquid crystal panel 100 may include a first polarizing film 110, a first transparent substrate 120, a liquid crystal layer 130, a second transparent substrate 140, a second polarizing film 150, and a cable 160.

The arrangement of the first polarizing film 110, the first transparent substrate 120, the liquid crystal layer 130, the second transparent substrate 140, the second polarizing film 150, and the cable 160 may be the same as the arrangement of the first polarizing film, the first transparent substrate, the liquid crystal layer, the second transparent substrate, the second polarizing film and the cable described in FIGS. 9 and 10.

For example, the cable 160 may be attached to a protruding member 140a in which the second transparent substrate 140 protrudes further than the first transparent substrate 120. A lower cover 170 may be attached to a protruding member 120a, in which the first transparent substrate 120 protrudes further than the first polarizing film 110, by a photocuring material 173.

The uncured-photocuring material 173 may be applied, coated, or printed on the protruding member 120a of the first transparent substrate 120, and cured by light so as to fix the lower cover 170 to the first transparent substrate 120.

The lower cover 170 may cover the front and lower sides of the lower edge of the liquid crystal panel 100, and the lower cover 170 may include a first cover member 171 extending downward from the second polarizing film 150 and a second cover member 172 extending rearward from one end of the first cover member 171.

A black paint 175 and a blackened-blackening material 174 may be provided on an outer surface 171a of the first cover member 171. The black paint 175 may include a black pigment, and may block light or have extremely low light transmittance. The blackening material 174 may be blackened by light such as ultraviolet rays, and the blackened-blackening material 174 may block light or have extremely low light transmittance.

The blackened-blackening material 174 may be provided in a region, which corresponds to the photocuring material 173, in the outer surface 171a of the first cover member 171, and the black paint 175 may be provided in a region in which the blackened-blackening material 174 is not provided. For example, as shown in FIG. 17, the blackened-blackening material 174 may be provided in an upper portion of the outer surface 171a of the first cover member 171 and the black paint 175 may be provided in a lower portion of the outer surface 171a of the first cover member 171.

In the outer surface 171a of the first cover member 171, patterns including various shapes for scattering light may be formed in the region, in which the blackened-blackening material 174 is provided.

For example, patterns of various shapes may be engraved on a region of the outer surface 171a of the first cover member 171. A stripe may be engraved or a dot pattern may be engraved. As illustrated in FIG. 17, a wedge-shaped stripe 171a may be engraved or a semi-cylindrical stripe may be engraved on a region of the outer surface 171a of the first cover member 171. In addition, a wedge-shaped dot pattern or a semi-cylindrical dot pattern may be engraved on a region of the outer surface 171a of the first cover member 171.

Alternatively, patterns of various shapes may be embossed on a region of the outer surface 171a of the first cover member 171. A stripe may be embossed or a dot pattern may be embossed. A wedge-shaped stripe or a semi-cylindrical stripe may be embossed on a region of the outer surface 171a of the first cover member 171. In addition, a wedge-shaped dot pattern or a semi-cylindrical dot pattern may be embossed on a region of the outer surface 171a of the first cover member 171.

The unblackened-blackening material 174 may be applied or coated on the region in which various shapes are engraved or embossed. The unblackened-blackening material 174 may be blackened by exposure to light such as ultraviolet rays.

Light (for example, ultraviolet rays) may be simultaneously emitted to the photocuring material 173 and the blackening material 174 to cure the photocuring material 173 and to blacken the blackening material 174.

As shown in FIG. 18, during the lower cover 170 is temporarily fixed to the first transparent substrate 120, the lamp L may be located under the lower cover 170, and light (for example, ultraviolet rays) may be emitted toward the lower cover 170 by the lamp L located under the lower cover 170.

The light emitted from the lamp L may be incident into the inside of the first cover member 171 through the lower end of the first cover member 171. The light incident into the first cover member 171 may be totally reflected inside the first cover member 171, and may be transmitted to the upper side of the first cover member 171 along the first cover member 171.

The light transmitted inside the first cover member 171 may be scattered in the region in which patterns of various shapes are engraved or embossed. The light scattered in the region in which patterns of various shapes are engraved or embossed may be emitted to the front of the first cover member 171 or emitted to the rear of the first cover member 171.

The light emitted to the front of the first cover member 171 may be incident on the blackening material 174, and the blackening material 174 may be blackened by the light. In addition, the light emitted to the rear of the first cover member 171 may be incident on the photocuring material 173, and the photocuring material 173 may be cured by the light.

Accordingly, the light emitted to the inside of the first cover member 171 by the lamp L may be scattered on the region on which the blackening material 174 is applied or coated, and the light may blacken the blackening material 174 and cure the photocuring material 173.

As described above, the light may be emitted to both the photocuring material 173 and the blackening material 174 through a single process. Particularly, the light of the lamp L may be directly emitted to the photocuring material 173, and thus the photocuring material 173 may be uniformly cured.

Because light such as ultraviolet rays is emitted into the inside of the first cover member 171 through the lower end of the first cover member 171, it is possible to prevent or suppress a damage in the liquid crystal panel 100 (for example, the polarizing film or the liquid crystal layer) or a change in physical/optical properties of the liquid crystal panel 100 caused by light such as ultraviolet rays.

As is apparent from the above description, a display apparatus may include a bezel including a minimized width.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
    a first film;
    a second film;
    a first substrate provided between the first film and the second film, the first substrate comprising a first protruding member protruding in a first direction from an edge of the first film and an edge of the second film;
    a second substrate provided between the first film and the second film, the second substrate comprising a second protruding member protruding in the first direction from an edge of the first substrate;
    a liquid crystal layer provided between the first substrate and the second substrate;
    a transparent cover transmitting a light and extending from the edge of the first film in the first direction;
    a blackening material provided on an outer surface of the transparent cover in a first region of the transparent cover, and including a photosensitizer blackened by ultraviolet light, the first region being adjacent to the first film;
    a photocuring material provided between the transparent cover and the first protrucing member of the first substrate, attaching the transparent cover to the first protruding member; and
    a black pain configured to block light and provided on the outer surface of the transparent cover in a second region of the transparent cover, in which the blackening material is not provided, the black paint being formed of a material different from the photosensitizer.

2. The display apparatus of claim 1, wherein the first region overlaps the first protruding member on which the photocuring material is provided.

3. The display apparatus of claim 1, wherein the blackening material has been blackened and the photocuring material has been cured by light that has been emitted to the first region in a second direction perpendicular to the first direction.

4. The display apparatus of claim 1, wherein the outer surface of the transparent cover in the first region has a stripe or a dot pattern that is engraved or embossed thereon.

5. The display apparatus of claim 1, wherein the blackening material has been blackened and the photocuring material is cured by light that has been emitted to an inside of the transparent cover in the first direction.

6. The display apparatus of claim 1, wherein the transparent cover comprises:
    a first transparent cover member extending from the edge of the first film in the first direction; and
    a second transparent cover member extending from one end of the first transparent cover member in a second direction that is perpendicular to the first direction.

7. The display apparatus of claim 1, wherein the second substrate comprises a plurality of pixel electrodes and a plurality of thin film transistors respectively connected to the plurality of pixel electrodes, and
    wherein the display apparatus further comprises a cable attached to the second protruding member and configured to transmit image data to the plurality of thin film transistors.

8. The display apparatus of claim 1, wherein the first film comprises a first polarizing film,
    wherein the second film comprises a second polarizing film, and
    wherein a polarizing direction of the first polarizing film is perpendicular to a polarizing direction of the second polarizing film.

9. The display apparatus of claim 1, wherein the first substrate is provided between the liquid crystal layer and the first film; and
    wherein the second substrate is provided between the liquid crystal layer and the second film.

10. A display apparatus comprising:
    a first film;
    a second film;
    a first substrate provided between the first film and the second film, the first substrate comprising a first protruding member protruding in a first direction from an edge of the first film and an edge of the second film;
    a second substrate provided between the first film and the second film, the second substrate comprising a second protruding member protruding in the first direction from an edge of the first substrate;
a liquied crystal layer provided between the first substrate and the second substrate;
a transparent cover transmitting a light and extending from the edge of the first film in the first direction;
a blackening material including a photsensitizer blackened by ultraviolet light;
a photocuring material provided between the transparent cover and the first protruding member of the first substrate, attaching the transparent cover to the first protruding member; and
a black paint configured to block light and being formed of a material different from the photosensitizer,
wherein the black paint is provided on an outer surface of the transparent cover in a first region of the transparent cover, the first region being adjacent to the first film, and
wherein the blackening material is provided on the outer surface of the transparent cover in a second region of the transparent cover, the second region being different than the first region.

11. The display apparatus of claim 10, wherein the second region does not overlap or only partially overlaps a region in which the photocuring material is provided.

12. The display apparatus of claim 10, wherein the blackening material has been blackened and the photocuring material has been cured by light that has been emitted to the second region at an angle.

13. A display apparatus, comprising:
a first film;
a second film;
a first substrate provided between the first film and the second film, the first substrate comprising a first protruding member protruding in a first direction from an edge of the first film and an edge of the second film;
a second substrate provided between the first film and the second film, the second substrate comprising a second protruding member protruding in the first direction from an edge of the first substrate;
a liquid crystal layer provided between the first substrate and the second substrate;
a transparent cover transmitting a light and extending from the edge of the first film in the first direction;
a blackening material provided on an inner surface of the transparent cover in a first region of the transparent cover, and including a photosensitizer blackened by ultraviolet light, the first region being adjacent to the first film;
a photocuring material provided between the transparent cover and the first protruding member of the first substrate, attaching the transparent cover to the first protruding member, and cured by the ultraviolet light passing through the transparent cover; and
a black paint configured to block light and provided on the inner surface of the transparent cover in a second region of the transparent cover, in which the blackening material is not provided, the black paint being formed of a material different from the photosensitizer.

14. The display apparatus of claim 13, wherein the first region overlaps the first protruding member on which the photocuring material is provided.

* * * * *